US010827149B2

(12) United States Patent
Pranger et al.

(10) Patent No.: US 10,827,149 B2
(45) Date of Patent: *Nov. 3, 2020

(54) METHODS AND SYSTEMS FOR UTILIZING MULTI-PANE VIDEO COMMUNICATIONS IN CONNECTION WITH CHECK DEPOSITING

(71) Applicant: POPio IP Holdings, LLC, Sandy, UT (US)

(72) Inventors: Eugene Patrick Pranger, Alpine, UT (US); Jed W. Taylor, South Jordan, UT (US); Timothy Eugene Pranger, Eagle Mountain, UT (US); Kurt Forsberg, American Fork, UT (US)

(73) Assignee: POPIO IP HOLDINGS, LLC, Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/592,587

(22) Filed: Oct. 3, 2019

(65) Prior Publication Data
US 2020/0036942 A1 Jan. 30, 2020

Related U.S. Application Data

(63) Continuation-in-part of application No. 16/115,037, filed on Aug. 28, 2018, which is a continuation of
(Continued)

(51) Int. Cl.
*H04N 7/14* (2006.01)
*G06F 3/0484* (2013.01)
(Continued)

(52) U.S. Cl.
CPC ......... *H04N 7/147* (2013.01); *G06F 3/04842* (2013.01); *G06F 3/1446* (2013.01);
(Continued)

(58) Field of Classification Search
USPC .............. 705/42, 4, 35; 455/414; 348/14.01
See application file for complete search history.

(56) References Cited

U.S. PATENT DOCUMENTS

D619,593 S    7/2010  Fujioka et al.
7,812,988 B2  10/2010 Doo
(Continued)

FOREIGN PATENT DOCUMENTS

EP         2833595 A1      2/2015
WO      WO 2017/180226   10/2017

OTHER PUBLICATIONS

International Search Report & Written Opinion as received in PCTUS2017-016584 dated Apr. 25, 2017.
(Continued)

*Primary Examiner* — Maria El-Zoobi
(74) *Attorney, Agent, or Firm* — Keller Jolley Preece

(57) ABSTRACT

Systems and methods are disclosed for establishing a video connection between a client device and a support terminal while enabling the support terminal to concurrently push display element triggers to the client device through a separate connection. In particular, a display element trigger can cause the client device to display, within a dual pane display of the client device, a display element within one pane and a video chat in another pane. The display element can include a check deposit element that enables a user of the client device to capture one or more images of a check and then transmit the image(s) for deposit by the support terminal during a video chat. The support terminal can analyze the image(s) of the check to identify check deposit data and then deposit the check accordingly while a support representative communicates with the user of the client device via the video chat.

20 Claims, 22 Drawing Sheets

Related U.S. Application Data application No. 15/498,290, filed on Apr. 26, 2017, now Pat. No. 10,091,459, which is a continuation of application No. 15/208,576, filed on Jul. 12, 2016, now Pat. No. 9,699,406, which is a continuation-in-part of application No. 29/561,280, filed on Apr. 14, 2016, now Pat. No. Des. 845,972.

(51) Int. Cl.
| | |
|---|---|
| H04N 5/232 | (2006.01) |
| G06Q 40/02 | (2012.01) |
| H04N 7/08 | (2006.01) |
| G06Q 20/04 | (2012.01) |
| G06Q 20/32 | (2012.01) |
| H04L 29/06 | (2006.01) |
| H04N 5/265 | (2006.01) |
| G06F 3/14 | (2006.01) |

(52) U.S. Cl.
CPC ....... *G06Q 20/042* (2013.01); *G06Q 20/3223* (2013.01); *G06Q 40/02* (2013.01); *H04L 65/1069* (2013.01); *H04N 5/23293* (2013.01); *H04N 5/265* (2013.01); *H04N 7/08* (2013.01)

(56) References Cited

U.S. PATENT DOCUMENTS

| | | | |
|---|---|---|---|
| 8,117,562 | B2 | 2/2012 | Getsch |
| D670,716 | S | 11/2012 | Majeed et al. |
| 8,433,650 | B1 | 4/2013 | Thomas |
| D700,912 | S | 3/2014 | Kim |
| 8,782,043 | B2 | 7/2014 | Chisholm et al. |
| 8,789,094 | B1 | 7/2014 | Singh et al. |
| 8,890,685 | B1 | 11/2014 | Sookman et al. |
| 8,924,465 | B1 | 12/2014 | Tunguz-Zawislak |
| 8,955,743 | B1 | 2/2015 | Block et al. |
| D725,133 | S | 3/2015 | Smirin et al. |
| D725,665 | S | 3/2015 | Tseng et al. |
| D726,736 | S | 4/2015 | Smirin et al. |
| D739,867 | S | 9/2015 | Faria et al. |
| D747,733 | S | 1/2016 | Scalisi |
| 9,245,100 | B2 | 1/2016 | Marco et al. |
| D755,812 | S | 5/2016 | Lim |
| D759,662 | S | 6/2016 | Panjabi |
| D760,259 | S | 6/2016 | Watson |
| D762,231 | S | 7/2016 | Pearson |
| D762,676 | S | 8/2016 | Lim |
| D762,686 | S | 8/2016 | Lee et al. |
| D763,872 | S | 8/2016 | Tussy |
| D765,683 | S | 9/2016 | Peng |
| D767,601 | S | 9/2016 | Zhou |
| D768,148 | S | 10/2016 | Jung et al. |
| D769,921 | S | 10/2016 | Smith |
| D770,487 | S | 11/2016 | Li |
| D770,488 | S | 11/2016 | Li |
| D774,061 | S | 12/2016 | Wu |
| D776,147 | S | 1/2017 | Simmons et al. |
| D777,733 | S | 1/2017 | Loosli et al. |
| D779,540 | S | 2/2017 | Rad et al. |
| D780,787 | S | 3/2017 | Gomez |
| D781,311 | S | 3/2017 | Rad et al. |
| D781,874 | S | 3/2017 | Dunn |
| D789,389 | S | 6/2017 | Kim et al. |
| D789,395 | S | 6/2017 | Weeresinghe |
| D789,956 | S | 6/2017 | Ortega et al. |
| D790,578 | S | 6/2017 | Hatzikostas |
| 9,699,406 | B1 | 7/2017 | Pranger et al. |
| D793,427 | S | 8/2017 | Sun |
| D797,118 | S | 9/2017 | Van Every et al. |
| D803,851 | S | 11/2017 | Vazquez |
| 9,820,085 | B1 | 11/2017 | Telang et al. |
| 10,091,459 | B2 | 10/2018 | Pranger et al. |
| 10,218,938 | B2 | 2/2019 | Taylor et al. |
| 10,218,939 | B2 | 2/2019 | Taylor et al. |
| D845,972 | S | 4/2019 | Pranger et al. |
| 10,402,790 | B1* | 9/2019 | Clark ........................ G07G 5/00 |
| 2005/0149630 | A1 | 7/2005 | Smolinski et al. |
| 2006/0114315 | A1 | 6/2006 | Crook |
| 2006/0152594 | A1 | 7/2006 | Landschaft et al. |
| 2007/0067267 | A1 | 3/2007 | Ives |
| 2007/0093241 | A1 | 4/2007 | Oh et al. |
| 2008/0075067 | A1* | 3/2008 | Guglielmi ............ H04W 76/15 370/352 |
| 2009/0313167 | A1 | 12/2009 | Dujari et al. |
| 2010/0053302 | A1 | 3/2010 | Ivashin et al. |
| 2010/0073454 | A1 | 3/2010 | Lovhaugen et al. |
| 2011/0106671 | A1* | 5/2011 | Minnis ................... G06Q 40/00 705/30 |
| 2011/0249073 | A1 | 10/2011 | Cranfill et al. |
| 2012/0017149 | A1 | 1/2012 | Lai et al. |
| 2012/0030741 | A1 | 2/2012 | Chai et al. |
| 2012/0079419 | A1 | 3/2012 | Ajitomi et al. |
| 2012/0251985 | A1 | 10/2012 | Steels et al. |
| 2012/0296747 | A1 | 11/2012 | Triola |
| 2013/0013499 | A1 | 1/2013 | Kalgi |
| 2013/0083066 | A1 | 4/2013 | Aoki et al. |
| 2013/0203345 | A1 | 8/2013 | Fisher |
| 2013/0297353 | A1* | 11/2013 | Strange ............... G06K 9/00449 705/4 |
| 2014/0022328 | A1 | 1/2014 | Gechter et al. |
| 2014/0051402 | A1 | 2/2014 | Qureshi |
| 2014/0063174 | A1 | 3/2014 | Junuzovic et al. |
| 2014/0106721 | A1* | 4/2014 | Calman ............... H04L 12/1818 455/416 |
| 2014/0214967 | A1 | 7/2014 | Baba et al. |
| 2015/0026351 | A1* | 1/2015 | Calman ............... H04L 65/1083 709/227 |
| 2015/0149536 | A1 | 5/2015 | Nishikawa et al. |
| 2015/0149565 | A1 | 5/2015 | Ahmed |
| 2015/0227298 | A1 | 8/2015 | Kim et al. |
| 2015/0234636 | A1 | 8/2015 | Barnes |
| 2015/0256695 | A1 | 9/2015 | Showering et al. |
| 2015/0304196 | A1 | 10/2015 | Sun et al. |
| 2015/0326729 | A1 | 11/2015 | Paolini-Subramanya |
| 2015/0334344 | A1 | 11/2015 | Shoemake |
| 2015/0350446 | A1 | 12/2015 | Glass et al. |
| 2016/0006817 | A1 | 1/2016 | Mitic et al. |
| 2016/0100298 | A1 | 4/2016 | Peterson |
| 2016/0104122 | A1 | 4/2016 | Mande et al. |
| 2016/0132847 | A1* | 5/2016 | Sarris ................... G06Q 20/32 705/42 |
| 2016/0192308 | A1 | 6/2016 | Turney et al. |
| 2016/0212255 | A1 | 7/2016 | Lee et al. |
| 2016/0224210 | A1 | 8/2016 | Moore et al. |
| 2016/0300030 | A1 | 10/2016 | Vann et al. |
| 2016/0337424 | A1 | 11/2016 | Mandyam |
| 2016/0378744 | A1 | 12/2016 | XiangLi et al. |
| 2017/0017635 | A1 | 1/2017 | Leliwa et al. |
| 2017/0140504 | A1 | 5/2017 | Jeong et al. |
| 2017/0150223 | A9 | 5/2017 | Zaccone et al. |
| 2017/0171700 | A1 | 6/2017 | Sabarez et al. |
| 2017/0270079 | A1 | 9/2017 | Rajwat et al. |
| 2017/0313262 | A1 | 11/2017 | Wisnia et al. |
| 2017/0366353 | A1 | 12/2017 | Struttmann |
| 2017/0368413 | A1 | 12/2017 | Shavit |
| 2018/0012432 | A1 | 1/2018 | Shin et al. |
| 2018/0018396 | A1 | 1/2018 | Roundtree et al. |
| 2018/0018838 | A1 | 1/2018 | Fankhauser et al. |
| 2018/0035074 | A1 | 2/2018 | Barnes |
| 2018/0054446 | A1 | 2/2018 | Modras |
| 2018/0103341 | A1 | 4/2018 | Moiyallah et al. |
| 2018/0104573 | A1 | 4/2018 | Jeffery et al. |
| 2018/0176272 | A1 | 6/2018 | Zur et al. |
| 2018/0367755 | A1 | 12/2018 | Pranger et al. |
| 2019/0052840 | A1 | 2/2019 | Taylor et al. |

OTHER PUBLICATIONS

U.S. Appl. No. 29/561,280, Jan. 24, 2018, Restriction Requirement.
U.S. Appl. No. 29/561,280, Aug. 14, 2018, Office Action.
U.S. Appl. No. 29/561,280, Feb. 6, 2019, Notice of Allowance.
U.S. Appl. No. 15/208,576, Nov. 30, 2016, Office Action.

(56) References Cited

OTHER PUBLICATIONS

U.S. Appl. No. 15/208,576, Feb. 16, 2017, Office Action.
U.S. Appl. No. 15/208,576, May 8, 2017, Office Action.
U.S. Appl. No. 15/208,576, May 24, 2017, Notice of Allowance.
U.S. Appl. No. 15/498,290, Oct. 19, 2017, Office Action.
U.S. Appl. No. 15/498,290, Mar. 21, 2018, Office Action.
U.S. Appl. No. 15/498,290, Jul. 18, 2018, Notice of Allowance.
U.S. Appl. No. 15/498,290, Aug. 24, 2018, Notice of Allowance.
U.S. Appl. No. 15/792,040, Apr. 26, 2018, Office Action.
U.S. Appl. No. 15/792,040, Sep. 11, 2018, Office Action.
U.S. Appl. No. 15/792,040, Nov. 9, 2018, Notice of Allowance.
U.S. Appl. No. 15/793,806, May 9, 2018, Office Action.
U.S. Appl. No. 15/793,806, Sep. 13, 2018, Office Action.
U.S. Appl. No. 15/793,806, Nov. 9, 2018, Notice of Allowance.
U.S. Appl. No. 16/160,379, May 24, 2019, Office Action.
U.S. Appl. No. 16/160,379, Oct. 3, 2019, Notice of Allowance.
U.S. Appl. No. 16/115,037, Apr. 30, 2019, Office Action.
U.S. Appl. No. 16/115,037, Sep. 9, 2019, Office Action.
U.S. Appl. No. 16/115,037, Jan. 21, 2020, Office Action.
U.S. Appl. 16/115,037, Jun. 10, 2020, Notice of Allowance.

* cited by examiner

METHODS AND SYSTEMS FOR UTILIZING MULTI-PANE VIDEO COMMUNICATIONS IN CONNECTION WITH CHECK DEPOSITING

CROSS-REFERENCE TO RELATED APPLICATIONS

The present application is a continuation-in-part of U.S. patent application Ser. No. 16/115,037, filed on Aug. 28, 2018, which is a continuation of U.S. patent application Ser. No. 15/498,290, filed on Apr. 26, 2017, now U.S. Pat. No. 10,091,459, which is a continuation of U.S. patent application Ser. No. 15/208,576, filed on Jul. 12, 2016, now U.S. Pat. No. 9,699,406, which is a continuation-in-part of U.S. patent application Ser. No. 29/561,280, filed on Apr. 14, 2016, now U.S. Pat. No. D845,972. Each of the aforementioned applications are hereby incorporated by reference in their entirety.

BACKGROUND

Many modern businesses create software applications (e.g., mobile applications) meant to improve accessibility to the business and allow a user to perform some desired function or access information on a client device (e.g., mobile device, laptop, etc.). Some businesses, such as game developers, operate their business solely through the software application itself. Other businesses, such as banks, may create a software application merely to provide customers a convenient alternative to visiting a brick and mortar branch of the business. This allows the user flexibility in determining when and where to interact with the business.

Despite these advantages, conventional software applications have several technological shortcomings that create inflexible and inefficient operation. For example, conventional software applications are typically inflexible, because they are poorly adapted for inexperienced users. To illustrate, users not familiar with technology in general may not understand how to interact with software applications or their underlying devices to find information or perform a desired function. Consequently, these users are often intimidated and may shy away from or experience frustration when using software applications. Even a user that is technologically savvy may be unfamiliar with a particular software application or the process required to accomplish the desired function. For example, a software application may enable a user to deposit a check via the application, but the user may be unaware of the steps required to do so (e.g., signing the check, capturing images of the check, submitting images of the check, etc.). Conventional software applications typically provide few tools (e.g., a FAQs section) to assist the user and may ultimately leave the user to learn the process independently. Thus, conventional software applications often fail to flexibly adapt to the various needs of users. This can lead to further frustration, which may lead the user to abandon the software application and, possibly, the business-customer relationship altogether.

Further problems of inflexibility of conventional software applications derive from the lack of interpersonal communication between the user and a representative of the business. Because conventional software applications generally act as a substitute for face-to-face interaction, a user may have little interaction with any people associated with the business. Consequently, the user may have very limited options through which to ask questions regarding confusing content or how to proceed through the process required to accomplish the desired function. In some instances, a user may seek confirmation via a representative of the business that an action or process has been performed correctly or verification that the correct information has been submitted. Many conventional systems, however, fail to accommodate such needs, providing little more than a notification or a digitally-rendered confirmation screen. In addition to inflexibility of the conventional software applications themselves, these problems can lead to a disconnect between the user and the business, which can weaken the business-customer relationship.

Additionally, conventional software applications can suffer from inflexibility by limiting the actions that can be performed by a user. For example, a financial institution (e.g., a bank or credit union) may require that a customer fund an account (e.g., by depositing money) in order to complete the process of opening the account. However, conventional software applications typically fail to provide a function whereby the customer can fund the account. Thus, a software application associated with the financial institution may limit the actions that can be performed by a given customer by preventing the customer from opening an account via the application. In such a case, the software application fails to flexibly operate as an effective substitute for visiting the financial institution in person.

Additionally, conventional software applications are inefficient. Indeed, many conventional software applications continually require the user to be the principal navigator and operator of the application. Though a user may seek assistance from a customer support representative in interacting with the application, the support representative is generally limited to orally providing instructions to the user (e.g., via a phone call). As a result, any rendered assistance fails to alleviate the burden of navigating and operating the application from the user. If the user doesn't understand how to navigate or operate the software application, even after receiving instruction, the resources of the software application (and the underlying device) may be needlessly tied up as the user tries to find the desired information or perform the desired function.

Prior attempts to improve a user's experience have included tutorial slide shows or videos, help documents, guided tours of the site or application, or other similar attempts to familiarize the user with the offered functionality. These solutions, however, typically do not cover every function offered, overload the user with too much information at once, or offer a predetermined explanation with no elaboration if the user does not understand.

Other solutions, such as telephone support, require the user to either use multiple devices to follow the representative's instructions while on the phone or to write down or memorize the instructions and perform them after the conversation has ended. This limits a user to seeking support only where multiple devices or writing materials are available. For example, a user may be trying to use a mobile application on their mobile device. Many mobile devices do not allow a user to talk on a phone call and navigate a mobile application at the same time. Thus, a phone call many not be sufficient to resolve the user's concerns.

Users may attempt to perform a video call or text chat session to obtain help with a software application. Again, some devices do not allow for simultaneous video chats and navigation of a software application. Furthermore, even if the devices allow for both, the use of two separate applications (the software application and a video chat application) requires switching back and forth between the video call application and the software application, requires large amounts of processing power to run both applications, or otherwise leads to a degraded experience. In other words, prior solutions inadequately address the aforementioned flexibility and efficiency concerns.

SUMMARY

One or more embodiments described herein provide benefits and/or solve one or more of the foregoing or other problems in the art with systems, methods, and non-transitory computer-readable media that improve computer systems by establishing a video connection between a client device (e.g., a mobile device) and a support terminal while also allowing the support terminal to trigger the display of display elements on the client device through a separate connection. In particular, establishing a separate connection providing bidirectional capabilities between the client device and the support terminal allows the support terminal to push display element triggers, or display elements themselves, directly to the client device while maintaining the video connection. In one or more embodiments, in response to receiving a display element trigger, the client device retrieves, renders, or otherwise obtains the corresponding display element. In some embodiments, the support terminal pushes the corresponding display element itself in conjunction with the display element trigger. Thus, rather than requiring a user of a client application on a client device to navigate the client application to find the display elements, the support terminal pushes triggers corresponding to these elements directly to the client device. In effect, the systems, methods, and non-transitory computer readable media allow a support terminal to remotely control the display of such elements on the client device.

Additionally, in one or more embodiments, when the client device receives a display element trigger, instructions stored on the client device execute, dividing the display of the client device into at least a first pane and a second pane (in alternative embodiments, the client device can receive a separate display trigger pushed by the support terminal). The first pane displays a video chat session and the second pane displays the corresponding display element. Thus, the user of the client device is able to maintain interpersonal communication with a user of the support terminal while reviewing and/or interacting with the display element/client application. In this way, a user of the client application is spared the hassle of using multiple devices or memorizing instructions when seeking help in navigating and using the client application.

To illustrate, a display element can include a check deposit element. Accordingly, a support terminal can push a check deposit trigger to the client device of a user seeking to deposit a check via the client application. In response to receiving the check deposit element trigger, the client device can divide its display screen so as to provide the video chat session in a first pane and the check deposit element in a second pane. Thus, the support representative using the support terminal can assist the user of the client device in utilizing the check deposit element to deposit one or more checks via the client application during the video chat session.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
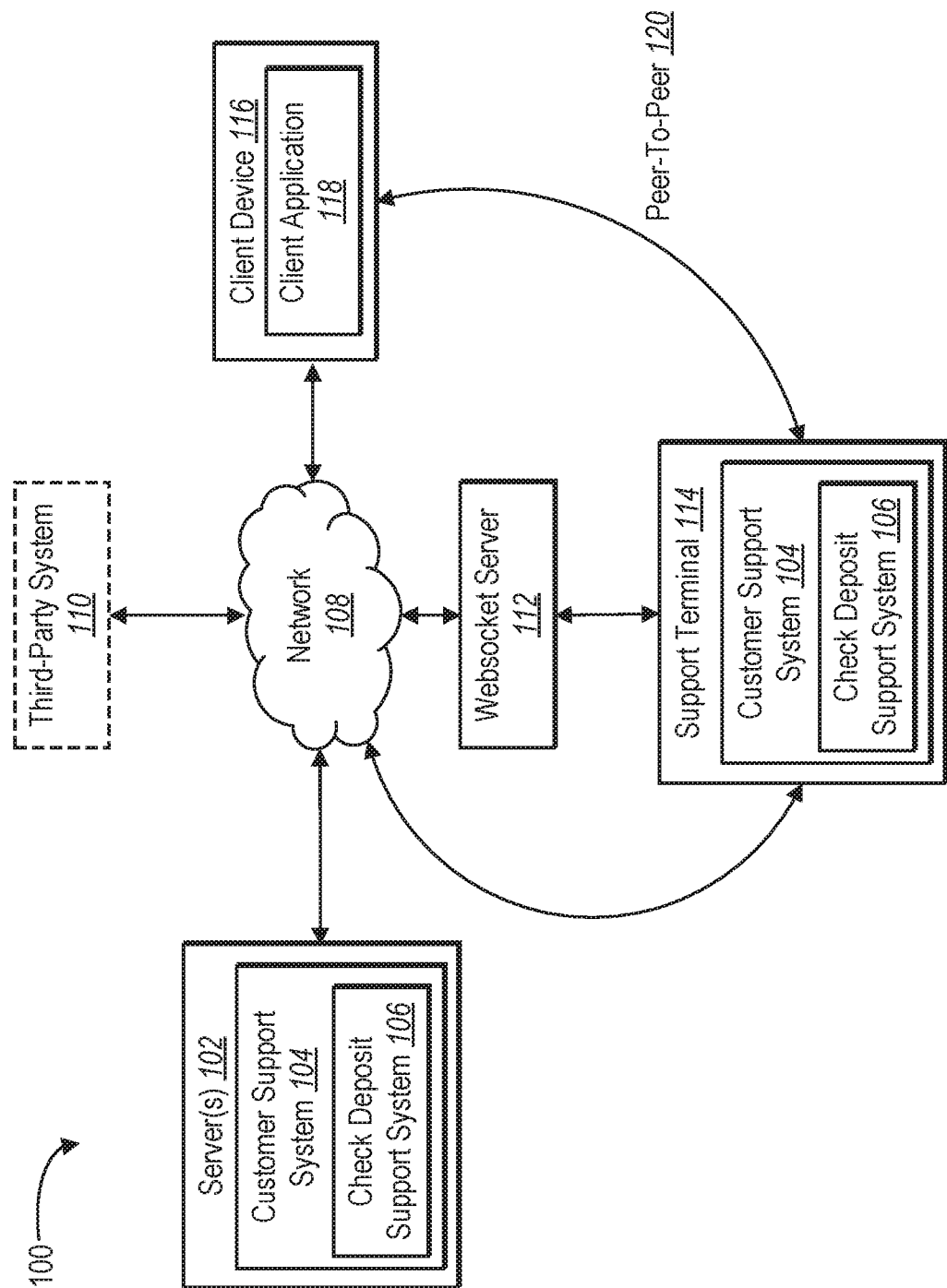
FIG. 1 illustrates an example environment in which a customer support system can operate in accordance with one or more embodiments.

One or more embodiments described herein include a customer support system that enables a single client application (e.g., a mobile application) to use multiple communication connections with a support terminal to provide a video chat on a client device (e.g., a mobile device) while concurrently providing a display element triggered by the support terminal. To illustrate, a user of the client device can access the customer support system via the client application. In one or more embodiments, a user interface of the client application provides a selectable option to request assistance from a support representative via video chat. In response to the user request, the customer support system can establish a video chat session between the client device and the support terminal. The video chat allows the user to communicate with a support representative using the support terminal and seek help in interacting with the client application.

During the video chat session, the customer support system enables the support representative to assist by allowing the support terminal to push a display element trigger to the client device. The display element trigger may correspond to a particular display element to be displayed on the client device. The display element may contain information to be viewed or a function to be performed at the client device. For example, the display element can comprise a video providing information about a particular service. Alternatively, the display element may contain an interactive feature, such as an element that allows the user to submit a document (e.g., submit a check for deposit). In one or more embodiments, the client device provides the display element on the client device while concurrently providing the video chat via a multi-pane display of the single client application. In this way, the user may receive further assistance while reviewing or interacting with the display element.

More particularly, the customer support system initiates a video chat session by establishing a first connection between a client device and a support terminal. Once established, the customer support system conducts a video chat transmitted through the first connection and provides the video chat for display to both the support terminal and the client device. A user of the client device and a support representative using the support terminal may then communicate with one another via the video chat.

Additionally, one or more embodiments of the customer support system enable the support terminal to push a display element trigger to the client device. For example, in at least one embodiment, the support terminal selects a display element trigger from a set of selectable display element triggers stored on the support terminal and subsequently pushes the display element trigger to the client device. The customer support system may transmit the display element trigger to the client device through a second connection. For example, the customer support system can use a second connection, separate from the first connection to send the display element trigger. One will appreciate in light of the disclosure herein that the use of a separate connection allows the support terminal to push the display element trigger, uses less computing resources, and avoids degrading the video chat. In one or more embodiments, the support terminal selects and transmits a display element in conjunction with the corresponding display element trigger. For example, by selecting and transmitting a display element trigger, the support terminal can automatically select and transmit the corresponding display element as well.

In response to the client device receiving the display element trigger, the client application can divide a display of the client device into multiple panes (e.g., two or more panes). In at least one embodiment, the client application divides the display into at least a first pane and a second pane. The customer support system then provides the video chat in the first pane while concurrently providing the display element corresponding to the display element trigger in the second pane. As mentioned, the client device can receive the display element in conjunction with the corresponding display element trigger. In some embodiments, however, in response to receiving the display element trigger, the client device retrieves, renders, or otherwise obtains the corresponding display element.

As further mentioned, the display element can include a check deposit element that facilitates the submission of one or more checks for deposit via the client application. Indeed, in one or more embodiments, the customer support system can employ a check deposit support system (e.g., a subsystem of the customer support system) to facilitate the deposit of checks. To illustrate, the support terminal can push a check deposit trigger to the client device using the second connection between the support terminal and the client device. In response to receiving the check deposit trigger, the client device can provide, on a display of the client device, the video chat between the client device and the support terminal in a first pane and a check deposit element in a second pane. The client device can utilize the check deposit element to capture and submit one or more images of a check for deposit by the support terminal during the video chat.

The customer support system can (e.g., via the check deposit support system) analyze the image(s) of a check in order to execute a process for depositing the check into an account of a financial institution associated with the user of the client device. For example, the customer support system can analyze the image(s), at the support terminal, to extract check deposit data. To illustrate, the customer support system can, at the support terminal, edit and reformat the image(s) of the check as needed, perform Magnetic Ink Character Recognition using Optical Character Recognition techniques (e.g., to identify the account number and routing number provided on the check), perform Courtesy Amount Recognition (e.g., to identify the courtesy amount included in the check), perform Legal Amount Recognition (e.g., to identify the legal amount included in the check), identify the date on the check, etc. In one or more embodiments, the customer support system utilizes one or more servers to perform the above analysis (i.e., the server(s) receives the image(s) of the check directly from the client device or the support terminal forwards the image(s) to the server(s)). Based on the extracted check deposit data, the customer support system can deposit the check, generate a deposit receipt, and/or transmit the deposit receipt back to the client device.

By concurrently providing a video chat and a display element, such as a check deposit element, the customer support system enables a support representative to more effectively guide a user of a client device through the entire process of interacting with a client application. Indeed, the customer support system flexibly adapts to the needs of users who are unfamiliar with or intimidated by an unfamiliar client application. In this way, the user avoids navigating the client application and, as a result, avoids possible frustration. Additionally, by using a connection that provides bidirectional communication, the support terminal provides the information or function directly to the client device. Bidirectional communication gives the customer support system advantages over a more traditional system in which a client device polls a server for data. In such traditional systems, a server may not initiate communication with a client device but may only respond to a request. Using a bidirectional connection, the customer support system allows the support terminal to immediately provide an available display element to the client device, rather than wait for a request. Thus, one or more embodiments provide for quicker processing/sending of display elements to a mobile device. Further, by providing check deposit elements and implementing the check deposit support system to process and deposit checks, the customer support system operates more flexibly by expanding the actions that can be performed. As an example, the customer support system can flexibly support functionality for opening an account by enabling a user to fund the account by depositing one or more checks while interacting with a support representative to complete the account-opening process.

Further, the client device displays the video chat and the display element concurrently using the same client application, and thus, requires fewer computer resources than a conventional system—such as memory, processing power, and display space—thus allowing a limited set of computer resources to perform functions faster than before. In particular, a user need not have a separate video chat application running together with the client application.

As illustrated by the foregoing discussion, the present disclosure uses a variety of terms to describe features and benefits of the customer support system. Additional detail is now provided regarding the meaning of these terms. For example, as used herein, the term "video chat" (or "video chat session") refers to a communication having a video element. In particular, a video chat can refer to a multi-directional communication involving at least two computing devices (e.g., a client device and a support terminal) in which users of the computing devices (e.g., a customer and a support representative) can communicate and at least one of the computing devices displays a video capturing a video element of the communication. For example, at least one of the computing devices can display a video stream captured by a camera associated with the at least one other computing device participating in the video chat.

Additionally, as used herein, the term "display element" refers to a visualization of data and/or interactive elements displayable on a user interface. In particular, a display element includes a visual means for viewing information or performing a task displayable on a user interface. For example, a display element can include a signature pad, a video, a fillable digital form, a selectable option for accepting terms, a document, or an informational slide. A display element can further include an interactive button enabling a user to submit that a corresponding task has been completed. Specifically, as used herein, the term "check deposit element" refers to a display element for facilitating check deposits. In particular, a check deposit element can refer to a visual means allowing a user to submit one or more checks for deposit into an account of a financial institution associated with the user. For example, a check deposit element can include a visual means that allows a user to capture and/or submit one or more images of a check for deposit using the client device upon which the check deposit element is displayed.

Additionally, as used herein, the term "display element trigger" refers to an instruction to display a display element. In particular, the term "display element trigger" can refer to an instruction executed on a computing device (e.g., a client device) to provide a corresponding display element on a display of the computing device. Execution of a display element trigger can further include locating, retrieving, rendering, or otherwise obtaining the display element. For example, a display element trigger can include a segment of code that includes an instruction to display a corresponding display element. A display element trigger can further include an indication of the corresponding display element (i.e., identifies the display element to be displayed). Specifically, as used herein, the term "check deposit trigger" refers to a display element trigger corresponding to a check deposit element.

Similarly, as used herein, the term "display trigger" refers to an instruction to divide a display of a computing device. In particular, a display trigger can refer to an instruction executed on a computing device (e.g., a client device) to divide a display of the computing device into multiple panes (i.e., at least a first pane and a second pane). For example, a display trigger can include a segment of code that includes an instruction to divide the display of the executing computing device. In one or more embodiments, a display element trigger performs the function of a display trigger in addition to triggering the display of a display element. In some embodiments, however, a display trigger is a separate trigger.

Further, as used herein, the term "check" refers to a document representing a transfer of assets. In particular, a check can refer to a legal document that authorizes the transfer of funds from an account associated with one entity to an account associated with another entity. For example, a check can authorize a transfer of money from a bank account of one person to a bank account of another person.

Additionally, as used herein, the term "check deposit data" refers to data associated with a check. In particular, check deposit data can refer to data that can be used to deposit funds authorized by a check into an account associated with a recipient of the check. For example, check deposit data can include, but is not limited to, one or more images of a check, Magnetic Ink Character Recognition data (e.g., an account number of an account associated with the entity authorizing the transfer of funds and/or a corresponding routing number), Courtesy Amount Recognition data (e.g., a courtesy amount included in the check), Legal Amount Recognition data (e.g., a legal amount included in the check), a check date, or any processing error data. Check deposit data can also include the account to which the funds are to be deposited (i.e., the deposit account).

Though the discussion herein includes implementations of the methods, systems, and non-transitory computer-readable media in the context of a banking software application, it will be appreciated that this context is merely illustrative and that the uses of the methods, systems, and non-transitory computer-readable media described extend beyond a banking application to other non-banking software applications. Further, though the methods, systems, and non-transitory computer-readable media are generally discussed with reference to a user accessing and interacting with the customer support system using a mobile application on a mobile device, it will be appreciated that the methods, systems, and non-transitory computer-readable media are equally effective for users using client applications on other types of client devices.

Additional detail regarding the customer support system will now be provided with reference to the figures. For example, FIG. 1 illustrates a schematic diagram of an exemplary system environment ("environment") 100 in which a customer support system 104 can be implemented. As illustrated in FIG. 1, the environment 100 can include a server(s) 102, a network 108, a third-party system 110, a Websocket server 112, a support terminal 114, a client device 116, and a peer-to-peer connection 120.

Although the environment 100 of FIG. 1 is depicted as having a particular number of components, the environment 100 can have any number of additional or alternative components (e.g., any number or servers, third-party systems, Websocket servers, support terminals, client devices, or other components in communication with the customer support system 104 via the network 108). Similarly, although FIG. 1 illustrates a particular arrangement of the server(s) 102, the network 108, the third-party system 110, the Websocket server 112, the support terminal 114, and the client device 116, various additional arrangements are possible.

Figure 17:
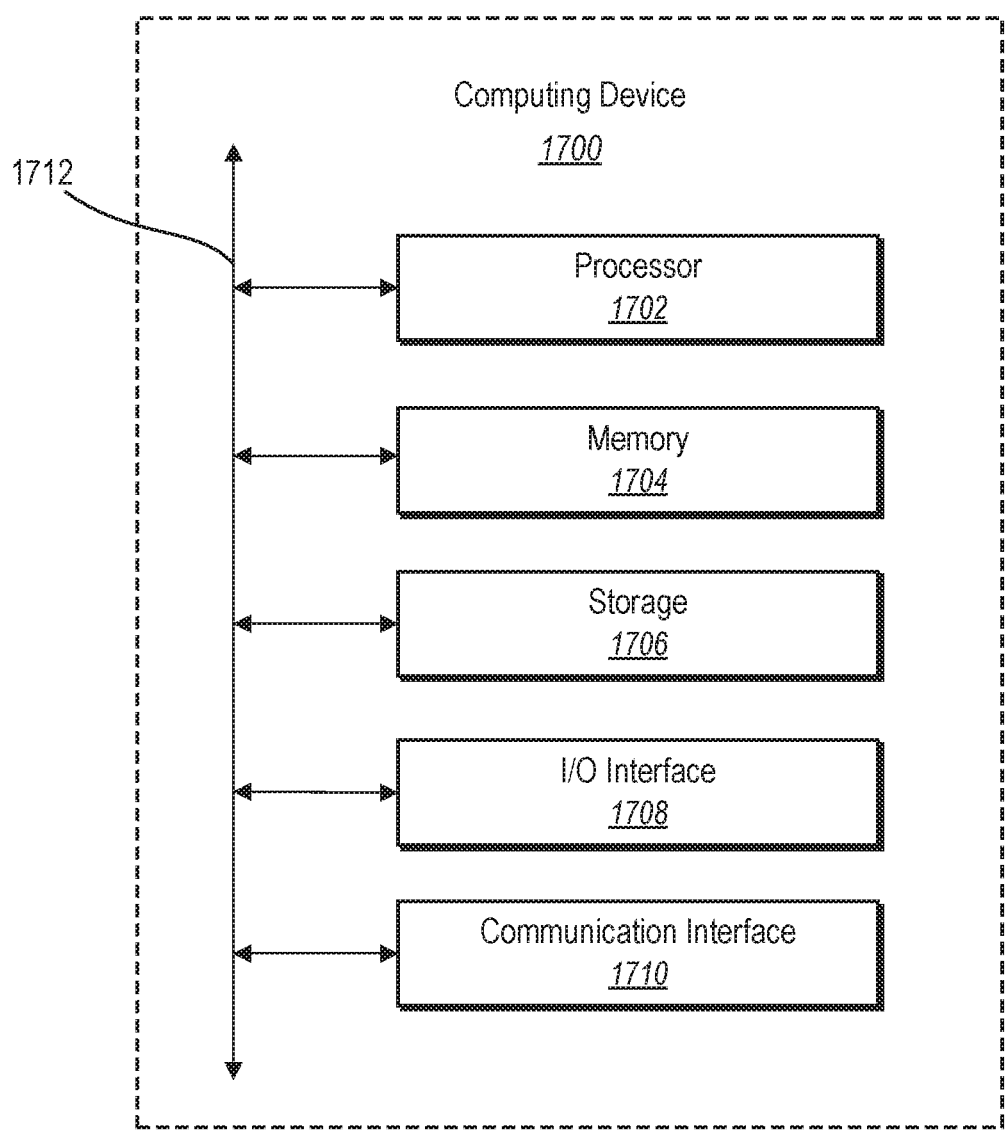
FIG. 17 illustrates a block diagram of an exemplary computing device in accordance with one or more embodiments.

The server(s) 102, the network 108, the third-party system 110, the Websocket server 112, the support terminal 114, and the client device 116 may be communicatively coupled with each other either directly or indirectly (e.g., through the network 108 as discussed in greater detail below in relation to FIG. 17). Moreover, the server(s) 102, the third-party system 110, the Websocket server 112, the support terminal 114, and the client device 116 may include a variety of computing devices (including one or more computing devices as discussed in greater detail with relation to FIG. 17).

As mentioned above, the environment 100 includes the server(s) 102. The server(s) 102 can generate, store, receive, and/or transmit data, including display elements (e.g., a check deposit element), display element triggers (e.g., a check deposit trigger), data resulting from a user interaction with a display element (e.g., one or more images of a check), video data, or a video chat request. For example, the server(s) 102 can transmit a check deposit trigger to a client device via one connection, while conducting a video chat between the client device and a support terminal through another connection. In particular, the server(s) 102 can utilize a push token to send a check deposit trigger to a native application (e.g., the client application 118) on the client device 116. The server(s) 102 can receive one or more images of a check captured by a check deposit element corresponding to the check deposit trigger for deposit. In one or more embodiments, the server(s) 102 comprises a data server. The server(s) 102 can also comprise a communication server or a web-hosting server.

In one or more embodiments, the server(s) 102 establishes a connection between the support terminal 114 and a client device (e.g., the client device 116). For example, the server(s) 102 can establish a connection in response to a video chat request sent by the client device 116. In particular, the server(s) 102 establishes the connection to allow transmission of a video chat between the support terminal 114 and the client device 116. For example, once the server(s) 102 establishes a connection, the server(s) 102 conducts a video chat between the support terminal 114 and the client device 116 through that connection. A support representative and a user can interact with the support terminal 114 and the client device 116, respectively, to communicate with one another via the video chat.

As illustrated, in one or more embodiments, the server(s) 102 comprises one server. Alternatively, the server(s) 102 may comprise a series of servers. For example, the server(s) 102 can comprise a video load balance server, a signaling server, and a STUN/TURN server. The video load balance server serves to direct communications to an available support terminal, the signaling server notifies the available support terminal of a video chat request, and the STUN/TURN server serves to work through secure firewalls to establish the connection. Alternatively, any other combinations and types of servers sufficient to establish a connection may be used as part of the server(s) 102.

Additionally, the server(s) 102 can execute or implement the customer support system 104. In particular, in one or more embodiments, the customer support system 104 utilizes the server(s) 102 to conduct video chats between a support terminal (e.g., the support terminal 114) and a client device (e.g. the client device 116), provide display element triggers (or the display elements themselves) to the client device, and receive data resulting from interaction with the corresponding display elements. For example, in one or more embodiments, the customer support system 104, via the server(s) 102, can conduct a video chat between a client device and a support terminal, where the video chat is transmitted through a first connection (e.g., a first connection between the client device and the support terminal). The customer support system 104, via the server(s) 102, can further transmit a display element trigger to the client device via a second connection (e.g., a second connection between the support terminal and the client device). During the video chat, customer support system 104, via the server(s) 102, can receive data resulting from interaction with the display element corresponding to the display element trigger.

As shown in FIG. 1, the customer support system 104 includes the check deposit support system 106. Indeed, in one or more embodiments, the customer support system 104 executes or implements the check deposit support system 106 in order to facilitate the deposit of one or more checks by a user of a client device. To illustrate, the customer support system 104 can use the check deposit support system 106 to transmit a check deposit trigger to the client device via the second connection. During the video chat, the customer support system 104 can use the check deposit support system 106 to identify check deposit data corresponding to one or more images of a check captured using the corresponding check deposit element (e.g., by analyzing the image(s) of the check) and deposit the check in a user account identified from the check using the check deposit data.

As shown in FIG. 1, the environment 100 also includes the support terminal 114. The support terminal 114 may comprise a computing device, such as those described below in relation to FIG. 17. For example, the support terminal 114 may comprise one or more personal computers, laptop computers, mobile devices, mobile phones, tablets, special purpose computers, televisions, or other computing devices. As shown, the support terminal 114 can also include the customer support system 104 and the check deposit support system 106. Indeed, in one or more embodiments, the support terminal 114 can execute or implement the customer support system 104. In some embodiments, the support terminal 114 executes or implements all features of the customer support system 104. In some embodiments, however, the support terminal 114 executes or implements a subset of the features of the customer support system 104. For example, the support terminal 114 can implement a first subset of features of the customer support system 104 and the server(s) 102 can implement a second subset of features of the customer support system 104 (which may, or may not, overlap with the first subset of features).

As further shown in FIG. 1, the environment 100 includes the third-party system 110. In one or more embodiments, the third-party system 110 includes a third-party system for analyzing images of checks. For example, as mentioned, the customer support system 104 can utilize the check deposit support system 106 to receive one or more images of a check captured by a client device using a check deposit element. In one or more embodiments, the customer support system 104 (e.g., the check deposit support system 106) transmits the image(s) of the check to the third-party system 110 for analysis to extract or identify check deposit data based on the image(s) of the check. In some embodiments, the third-party system 110 receives the image(s) of the check directly from the client device. The customer support system 104 can receive the extracted check deposit data for further processing and/or depositing of the check.

In one or more embodiments, the client device 116 includes a client device that allows a user of the device to receive and interact with display elements. For example, the client device 116 can include a smartphone, a tablet, a desktop, a computer, a laptop computer, or another electronic device. The client device 116 can include one or more applications (e.g., the client application 118) that allow the user to receive and interact with display elements. For example, the client application 118 can include a software application installed on the client device 116. Additionally, or alternatively, the client application 118 can include a software application hosted on the server(s) 102 or support terminal 114, which may be accessed by the client device 116 through another application, such as a web browser.

As is also illustrated in FIG. 1, the environment 100 may also include the Websocket server 112. The Websocket server 112 may generate, store, receive, and transmit any type of data, including a display element trigger (not shown). For example, the Websocket server 112 may receive and push a display element trigger sent from the support terminal 114 to the client device 116.

As shown in FIG. 1, the support terminal 114 can communicate with the client device 116 through the server(s) 102, the WebSocket server 112, and/or the peer-to-peer connection 120. For example, the support terminal 114 can communicate with the client device 116 using two or more channels of communication. To illustrate, the support terminal 114 can conduct a video chat with the client device 116 through the server(s) 102 or the peer-to-peer connection 120 while concurrently pushing display element triggers (and, possibly, the corresponding display elements) to the client device 116 through the WebSocket server 112.

In particular, the peer-to-peer connection 120 serves as a direct connection between the support terminal 114 and the client device 116. In one or more embodiments, the peer-to-peer connection 120 can serve to substitute for the server(s) 102. For example, after the server(s) 102 establishes the connection between the support terminal 114 and the client device 116, the support terminal 114 can subsequently establish the peer-to-peer connection 120 and conduct the video chat over that connection. As used herein, a peer-to-peer (P2P) connection is created when two or more client computing devices are connected and share resources without going through a separate server computing device (e.g., the server(s) 102). The peer-to-peer connection 120 can provide a solution to bandwidth limitations that restrict the maximum number of concurrent video streams possible through the server(s) 102. The peer-to-peer connections, where possible, maximize the number of possible simultaneous video calls.

In one or more embodiments, the server(s) 102 may first determine if the peer-to-peer connection 120 is available. For example, the peer-to-peer connection 120 may be unavailable due to limitations or the configuration of the hardware or software within the environment 100. For example, video relays between client devices on restrictive networks and firewalls are often blocked. Network address translation limits the client device's ability to have peer-to-peer connections. In one or more embodiments, the server(s) 102 detects when a peer-to-peer connection is not possible. If the server(s) 102 determines that the peer-to-peer connection 120 is not available, then the server(s) 102 may maintain (or reroute) the connection for the video chat. In an alternative embodiment, the server(s) 102 may maintain the connection with a client device whether or not the peer-to-peer connection 120 is available.

As mentioned, the customer support system 104 can be implemented in whole, or in part, by the individual elements of the environment 100. Although FIG. 1 illustrates the customer support system 104 being implemented by the server(s) 102 and/or the support terminal 114, it will be appreciated that one or more components of the customer support system 104 can be implemented in a variety of the components of the environment 100. For example, one or more components of the customer support system 104 can be implemented by a client device. Example components of the customer support system 104 will be discussed in more detail with regard to FIG. 14 below.

Figure 2:
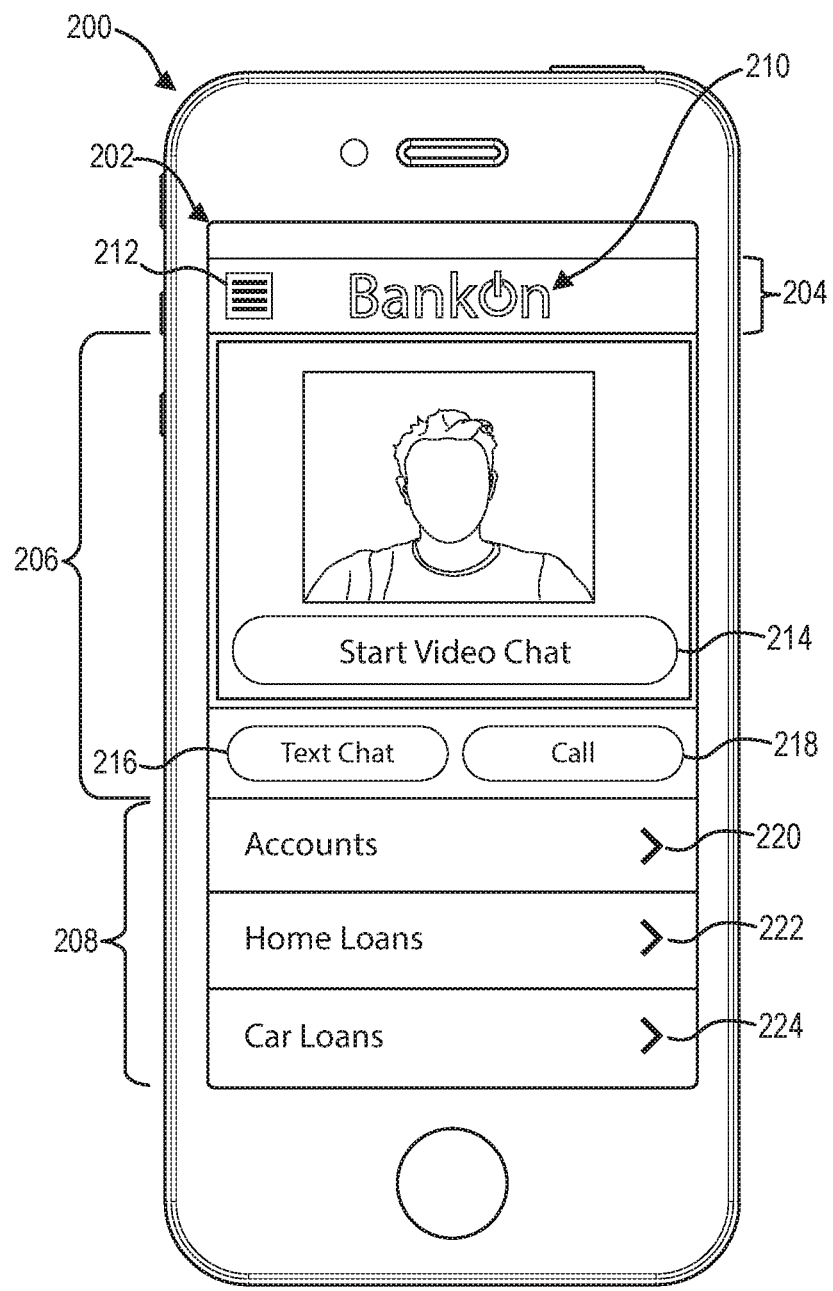
FIG. 2 illustrates a mobile device displaying an application user interface operable to enable a mobile device user to interact with a mobile application in accordance with one or more embodiments.

FIG. 2 illustrates a mobile device 200 displaying an application user interface 202 operable to allow a user to interact with a mobile application in accordance with one or more embodiments. The application user interface 202 includes a heading portion 204, a customer support portion 206, and a navigation portion 208. In alternate embodiments, the application user interface 202 may include any other portions relevant to the mobile application.

Heading portion 204 of application user interface 202 provides general information and options for the user. FIG. 2 illustrates heading portion 204 providing a title 210 and a menu 212. The title 210 provides the title of the business but may alternatively provide the name of the mobile application or any other title deemed sufficient for the purposes of the mobile application. The menu 212 provides a drop-down menu with pre-selected options for interacting with the mobile application. For example, the drop-down menu provides the user with an option of logging into a user account or navigating to a home page of the mobile application. In one or more alternative embodiments, the menu 212 may be replaced with links in the heading portion 204 providing the user with similar options.

Customer support portion 206 provides an option to contact a support representative to receive assistance. For example, a user who is unfamiliar with a mobile application may need assistance in finding information or performing a desired function. By way of illustration, in the context of a mobile banking application, the user may require help in applying for a loan, finding account balances, performing a check deposit, making a credit card payment, or interacting with the mobile application in another way.

As illustrated in FIG. 2, the customer support portion 206 includes multiple selectable buttons the user can select to contact a support representative. For example, the customer support portion 206 of FIG. 2 includes a video chat button 214, a text chat button 216, and a phone call button 218, which the mobile application may use to initiate a video chat, a text chat, or a phone call respectively. In response to a selection, the mobile device 200 sends a request to initiate a communications session of the type associated with the button. For example, by selecting the video chat button 214, the mobile device 200 sends a request to begin a video chat session with a support representative.

Alternatively, the customer support portion 206 may include other selectable buttons to contact the support representative, such as an option to e-mail or send a voice-recorded message. It will also be appreciated that any number of selectable buttons may be present in the customer support portion 206 in any combination. To illustrate, the customer support portion 206 may include selectable buttons for video chat, text chat, phone call, and email message, or the customer support portion 206 may only include the video chat button 214.

The navigation portion 208 presents the user with quick navigational options. For example, the navigation portion 208 of FIG. 2 presents options to navigate to a page comprising information on accounts 220, information on home loans 222, or information on car loans 224. In one or more embodiments, other options deemed useful to the user may also be present.

Figure 3:
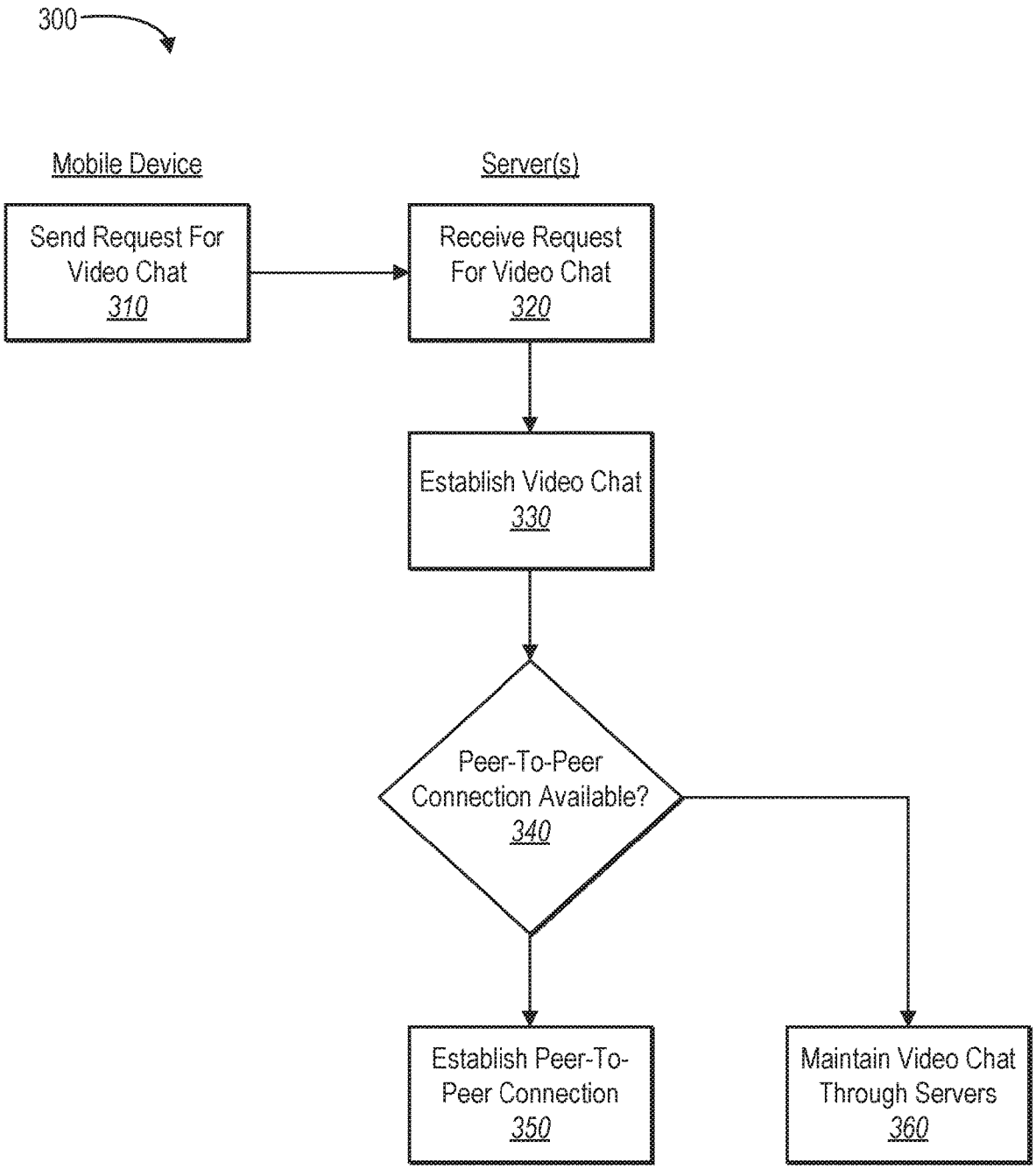
FIG. 3 illustrates a flowchart of a series of acts in a method of initiating a video chat connection between a mobile device and a support terminal in accordance with one or more embodiments.

As mentioned previously, one or more embodiments include a video chat between a client device (e.g., a mobile device) and a support terminal. FIG. 3 illustrates a flowchart of a series of acts 300 of initiating a video chat connection between a mobile device and a support terminal in accordance with one or more embodiments. Though FIG. 3 illustrates the series of acts 300 implemented in the context of a user using a mobile device, one or more embodiments involve the user utilizing another type of client device (e.g., desktop, laptop, tablet, etc.). In one or more embodiments, the series of acts 300 is performed in a hardware environment that includes the environment 100. The series of acts 300 is intended to be illustrative of one or more methods in accordance with the present disclosure and is not intended to limit potential embodiments. Alternative embodiments can include additional, fewer, or different steps than those articulated in FIG. 3.

As illustrated in FIG. 3, the series of acts 300 includes an act 310 of sending, from a mobile device, a request to initiate a video chat. The request can initially be processed by a series of one or more servers, such as the server(s) 102 of FIG. 1. As discussed above, the server(s) 102 may contain a load balance server, a signaling server, and a STUN/TURN server. Alternatively, the request may be sent through a single server that performs the same functionality as the combination of servers. In particular, the act 310 includes sending a request from the mobile device to initiate a video chat between the mobile device and a support terminal.

Moreover, as illustrated in FIG. 3, the series of acts 300 also includes an act 320 of receiving the request to initiate a video chat. Furthermore, FIG. 3 illustrates that the series of acts 300 also includes an act 330 of establishing a video chat between the mobile device and a support terminal. In particular, the act 330 comprises establishing a first connection between the mobile device and the support terminal and conducting a video chat transmitted across the first connection. In particular, the first connection can comprise a connection established through the server(s) 102.

As shown in FIG. 3, the series of acts 300 also includes the act 340 of determining whether a peer-to-peer connection is available between the mobile device and the support terminal. In response to determining that a peer-to-peer connection is available, the series of acts 300 proceeds to the act 350 of establishing a peer-to-peer connection between the mobile device and the support terminal. In particular, the act 350 switches the video chat from being conducted via a connection through the server(s) 102 to a peer-to-peer connection (i.e., the peer-to-peer connection 120). In one or more embodiments, the act 350 may include severing the connection through server(s) 102 after the peer-to-peer connection has been established between the mobile device and the support terminal. One will appreciate in light of the disclosure herein that the use of a peer-to-peer connection to conduct the video chat can reduce system resources needed for the video chat, provide greater flexibility, and in some cases allow for quicker communication between the mobile device and the support terminal.

Alternatively, in response to determining that a peer-to-peer connection is not available, the series of acts 300 proceeds to the act 360 of maintaining the video chat through the server(s) 102. In one or more embodiments, the video chat may be maintained through the server(s) 102 whether or not a peer-to-peer connection is available.

Figure 4:
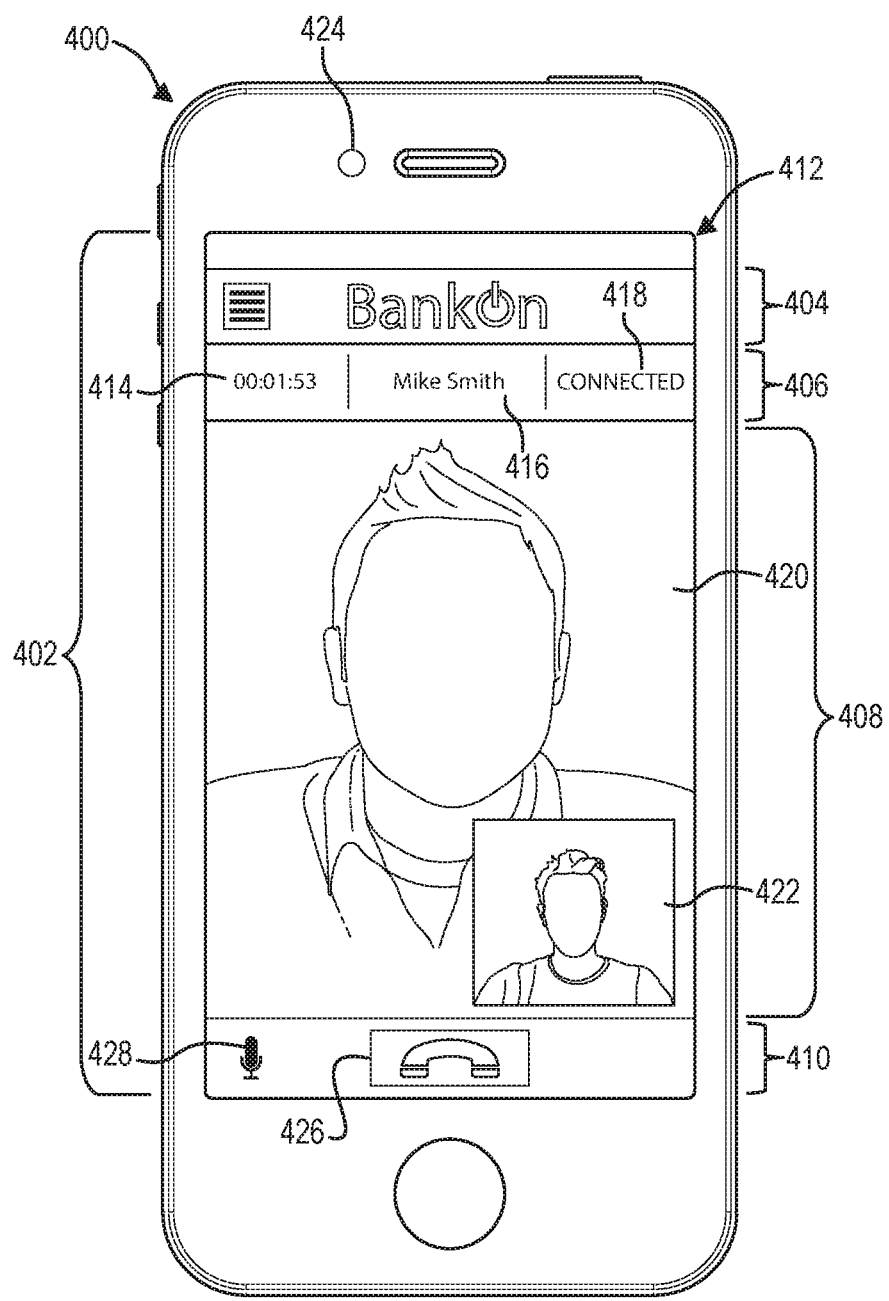
FIG. 4 illustrates a mobile device displaying a video chat interface in accordance with one or more embodiments.

FIG. 4 illustrates a mobile device 400 displaying a video chat interface 402 after a video chat has been established between a mobile device and a support terminal. The video chat interface 402 includes a heading portion 404, a session information portion 406, a video chat display portion 408, and a session control portion 410. As illustrated in FIG. 4, the video chat interface 402 utilizes the entirety of the mobile device display screen 412. In one or more alternative embodiments, the video chat interface 402 utilizes less than the entirety of the mobile device display screen 412 in response to receiving a default display element trigger from a support terminal immediately after the video chat is established.

As illustrated in FIG. 4, the session information portion 406 of the video chat interface 402 displays information regarding the video chat session conducted between the mobile device and the support terminal. In particular, the session information portion 406 includes a time-keeping portion 414, a support representative identity portion 416, and a connection status portion 418. The time-keeping portion 414 displays the duration of the current video chat session. The support representative identity portion 414 displays the name of the support representative engaging in the video chat session. The connection status portion 418 displays the status of the connection between the mobile device and the support terminal. In one or more embodiments, the connection status portion 418 can indicate whether the video chat is being conducted via a peer-to-peer connection or not.

As illustrated in FIG. 4, the video chat display portion 408 includes a support representative display 420 and a mobile device user display 422. In particular, the support representative display 420 displays video content captured by the support terminal. The mobile device user display 422 displays video content captured by a camera 424 of the mobile device 400. As shown in FIG. 4, mobile device user display 422 is displayed in a lower right corner of the video chat display portion 408. Alternatively, the mobile device user display 422 may be displayed in another location of the video chat display portion 408. In one or more embodiments, the mobile device user display 422 may be relocated to another location in response to detecting a user interaction. For example, a user may select and, with a dragging motion, relocate the mobile device user display 422 to another location.

As further illustrated in FIG. 4, the session control portion 410 of the video chat interface 402 includes a session end option 426 and a microphone mute option 428. Alternatively, one or more embodiments may include other options, such as a record option to record the audio content, visual content, or both from the video chat session.

In establishing a video chat between a client device and a support terminal, the customer support system 104 (e.g., via the support terminal or a server) can send instructions to the client device to display the video chat concurrently with a display element. For example, the customer support system 104 can send a display element trigger to the client device that causes the client device to partition its display into multiple panes and to display the video chat in one pane and the corresponding display element in another pane. As mentioned above, in some embodiments, the customer support system 104 (e.g., via the support terminal or a server) sends a separate display trigger, in addition to the display element trigger, to cause the mobile device to partition its display. To illustrate, in some embodiment, a display element trigger causes the client device to retrieve, render, or otherwise obtain a corresponding display element and the display trigger separately causes the client device to partition its display so as to display the display element concurrently with the video chat.

Figure 5:
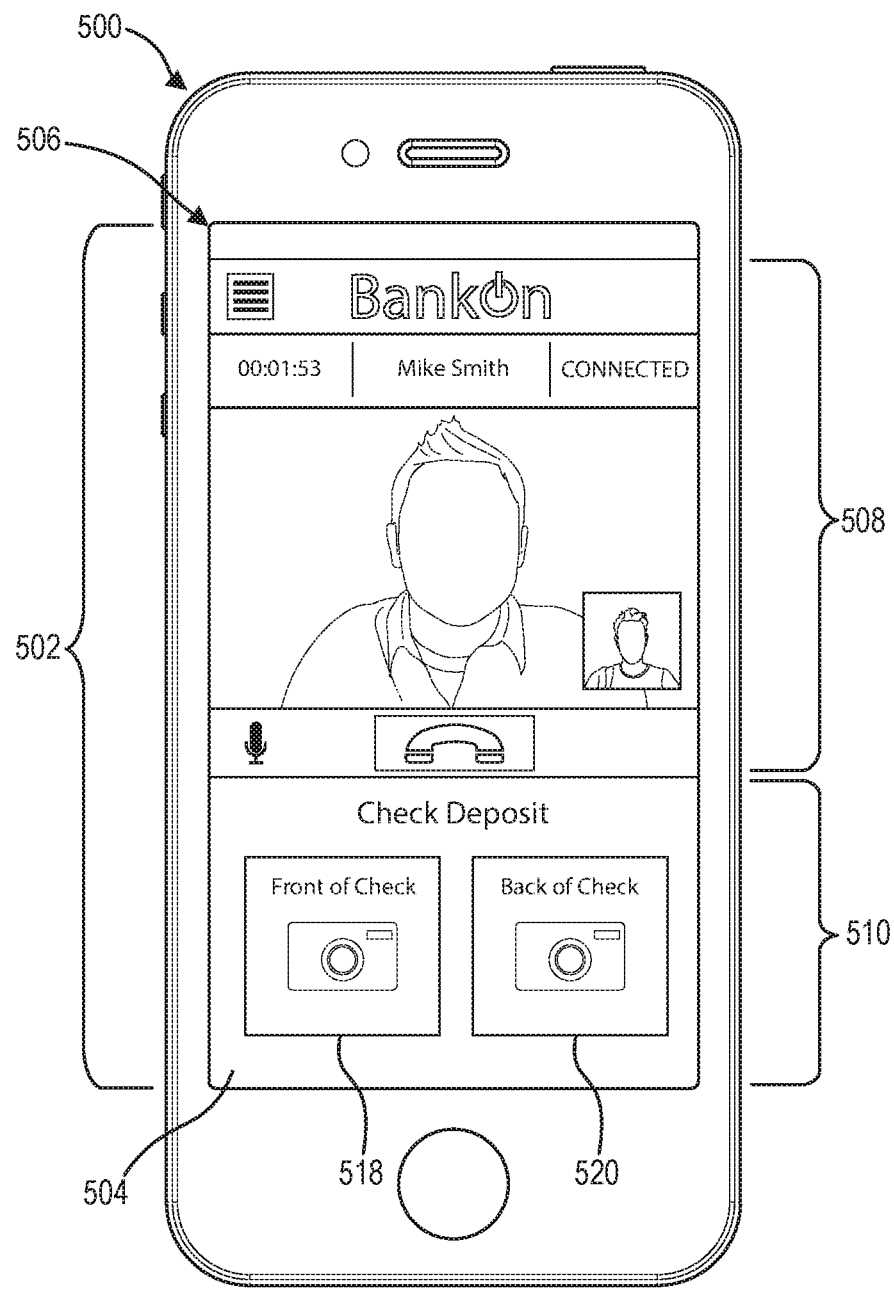
FIG. 5 illustrates a mobile device displaying a dual pane display with a check deposit element in accordance with one or more embodiments.

In one or more embodiments, the display element trigger (and/or the display trigger) comprises a piece of JavaScript or other code that, when received by the client device, cause the client device to split the display into multiple panes. More specifically, the display element trigger can cause the client device to execute code previously installed on the client device as part of the client application. Such code can cause the client device to provide multiple panes as described hereinafter. FIG. 5 provides one exemplary embodiment of a mobile device displaying a dual pane display in which the mobile device displays a display element concurrently with a video chat. Additional exemplary embodiments of a mobile device providing a dual pane display in which the mobile device displays one of various additional display elements concurrently with a video chat will also be discussed below with reference to FIGS. 12A-12E.

As illustrated in FIG. 5 (an as similarly illustrated in FIGS. 12A-12E), the mobile device 500 provides the dual pane display 502 by dividing the mobile device display screen 506 into a first pane 508 and a second pane 510 (in alternative embodiments, there may be more than two panes). As illustrated, the mobile device 500 provides the video chat in the first pane 508 and the display element 504 in the second pane 510. Alternatively, the mobile device 500 may divide the display screen 506 into three or more panes in response to multiple display element triggers simultaneously or in response to receiving a display element trigger corresponding to a display element formatted to use multiple panes.

In one or more embodiments, a mobile device user may choose to accept or reject the display element 504 before it is displayed in the second pane 510. For example, in response to receiving a display element trigger corresponding to the display element 504, the display screen 506 may divide into a first pane 508 and a second pane 510. A screen may be subsequently provided in the second pane 510, displaying selectable options to the user of the mobile device 500 to either accept or reject the display element 504. The display element 504 will display in the second pane 510 only when the user selects to accept it. Otherwise, if the user chooses to reject the display element 504, the first pane 508 and the second pane 510 may converge back into a single display (such as that shown in FIG. 4). It should be noted that a mobile device can operate similarly for any display element having a corresponding display element trigger sent to the mobile device.

Additionally, the mobile device 500 may modify the size of the first pane 508 and the second pane 510 on the display screen 506 or of any other panes based on the size of the display element (e.g., the display element 504). For example, the display element may require more than half of the display screen 506. As a result, the display screen 506 will divide into a first pane 508 and a second pane 510, wherein the second pane 510 fills the majority of the display space of the display screen 506 and the first pane 508 fills the remaining space available.

In one or more embodiments, a mobile device user may modify a display element. Alternatively, a display element may be static and only meant for viewing. In one or more embodiments, providing and modifying a display element may occur independent of any interaction with the video chat provided in the first pane 508.

As mentioned, FIG. 5 illustrates an embodiment of the mobile device 500 displaying a dual pane display 502 in which the mobile device 500 displays a display element 504 concurrently with a video chat. In particular, as shown in FIG. 5, the display element 504 includes a check deposit element. Indeed, the check deposit element includes an interface for capturing multiple images for check deposit. In particular, as shown in FIG. 5, the check deposit element comprises a first button 518 and a second button 520, wherein the first button 518 designates a captured image as a front view of a check and the second button 520 designates a captured image as a back view of a check. Upon detecting a user selection of the first button 518 or the second button 520, the video chat provided in the first pane 508 overlays the display of the video chat or the display of the check deposit element with a viewfinder display (not shown), wherein the viewfinder display provides a representation of image data captured by a camera (camera on back of device not shown) of the mobile device 500. Alternatively, when the mobile device 500 receives the check deposit trigger, it may also receive a camera trigger that immediately activates the camera and overlays the video chat in the first pane 508 or the display element 504 in the second pane 510 with the viewfinder display.

In one or more embodiments, the mobile device 500 is associated with a plurality of cameras. Accordingly, activating a camera of the mobile device 500 can include providing one or more selectable options whereby a user can indicate which camera to use. The mobile device 500 can receive a user interaction (e.g., via the one or more selectable options) selecting a camera from among the plurality of cameras and activate the selected camera accordingly.

In one or more embodiments, while providing the viewfinder display, the video chat may be continuously received by the mobile device 500 (whether or not the mobile device 500 overlays the video chat with the viewfinder display). Alternatively, the visual data from the video chat may temporarily cut off (e.g., where the mobile device 500 overlays the video chat with the viewfinder display) until a user indicates that capturing images is done. Additionally, or alternatively, the audio from the video chat transmission is still available while the mobile device user captures the images, so that the support representative may guide the mobile device user through the process.

In one or more embodiments, one or more images of the check captured by the mobile device 500 via the check deposit element are automatically sent to the support terminal (or a server, such as the server(s) 102 of FIG. 1) for verification and check deposit. Alternatively, in one or more embodiments, the check deposit element may include an additional button for sending an image file that has been captured to the satisfaction of the mobile device user. In some embodiments, rather than, or in addition to, sending the image(s) of the check to the support terminal or the server, the mobile device 500 can send the images of the check to a third-party service (e.g., the third-party system 110 of FIG. 1).

One skilled in the art will appreciate that the display element 504 may function to capture images of documents other than checks and that FIG. 5 is provided only as an illustration. For example, in one or more embodiments, the display element 504 may enable a user to capture an image of a contract, identification, or other document that may be required by the support representative.

Figure 6A:
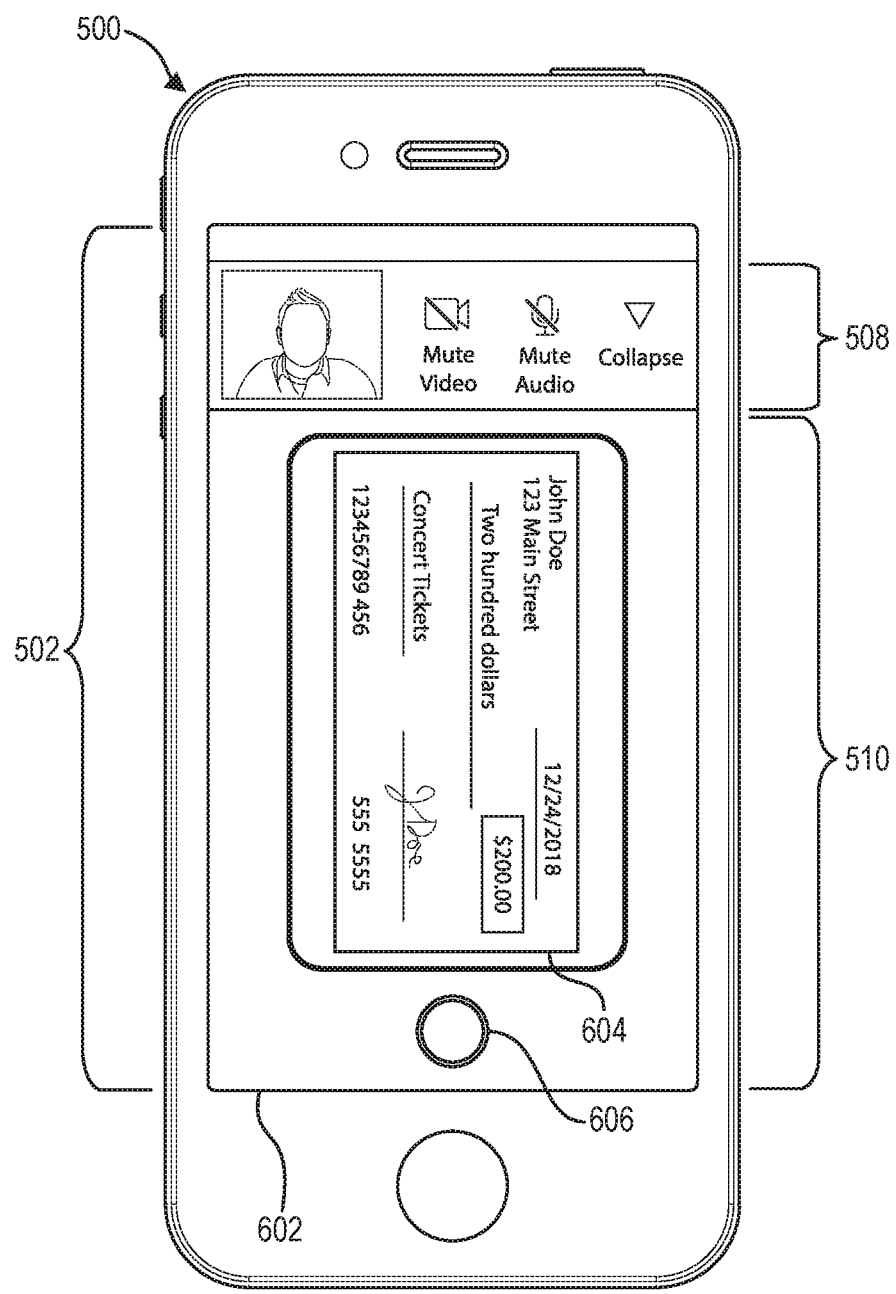
FIGS. 6A-6B illustrate a mobile device capturing images of a check using a check deposit element in accordance with one or more embodiments.
Figure 6B:
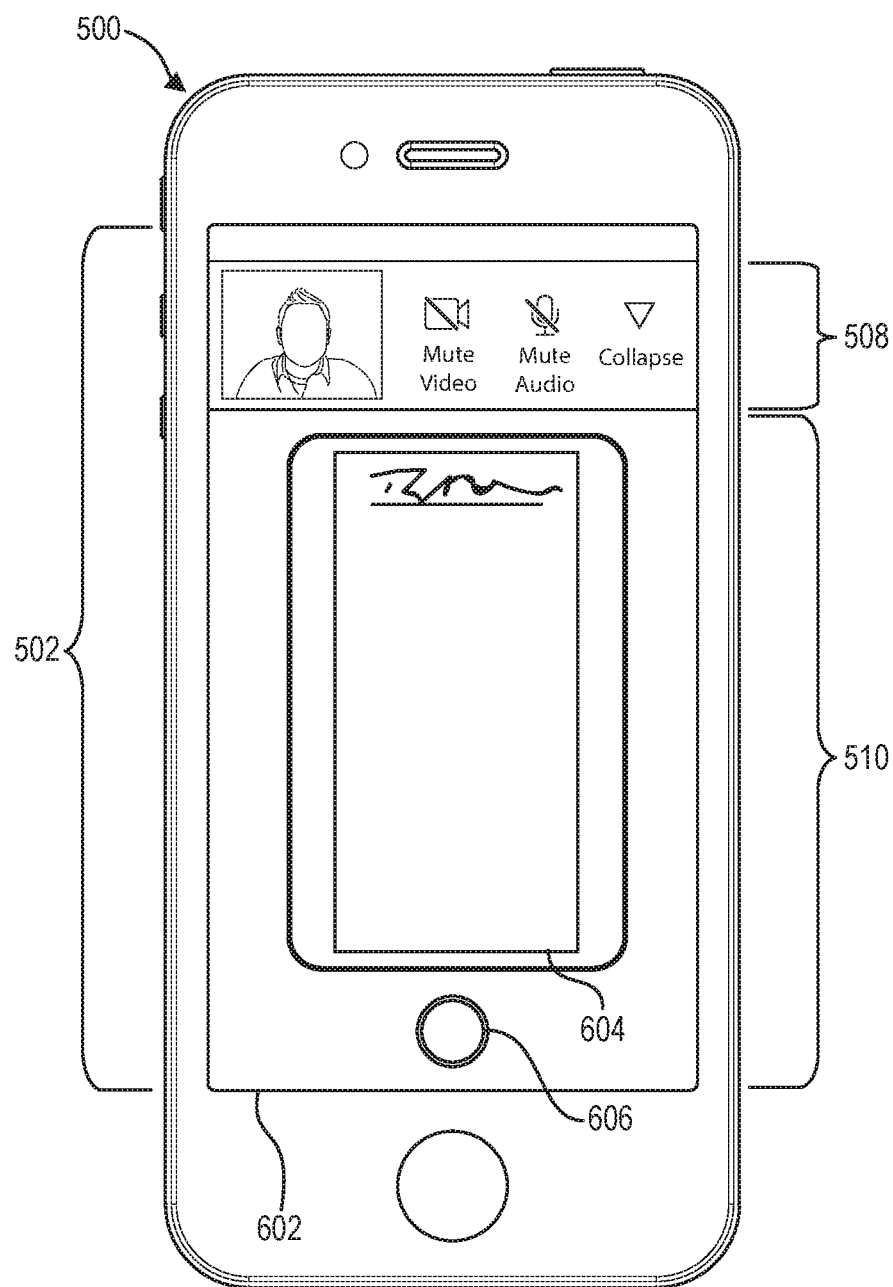

As mentioned above, upon detecting user selection of the first button 518 or the second button 520 displayed within the check deposit element, the mobile device 500 can overlay either the first pane 508 or the second pane 510 (or in some embodiments, both panes) of the dual pane display 502 with a viewfinder display. Indeed, in some embodiments, the mobile device displays the viewfinder display within the check deposit element displayed in the second pane 510 (i.e., overlays the display providing the first button 518 and the second button 520 with the viewfinder display). In one or more embodiments, the mobile device 500 displays the viewfinder display automatically in response to receiving the check deposit trigger. FIGS. 6A-6B illustrate exemplary embodiments of the mobile device 500 providing a viewfinder display.

Referring to FIGS. 6A-6B together, the mobile device 500 displays the viewfinder display 602, which provides a representation of image data captured by a camera of the mobile device 500 (i.e., the camera on the back of the mobile device 500). In particular, in FIG. 6A, the viewfinder display 602 provides a representation of image data corresponding to the front-side of a check 604. Similarly, in FIG. 6B, the viewfinder display 602 provides a representation of image data corresponding to the back-side of the check 604.

As further shown in FIGS. 6A-6B, the viewfinder display 602 includes an image capture button 606. Upon detecting a user selection of the image capture button 606, the mobile device 500, using the camera, can capture an image based on the image data represented within the viewfinder display 602. Indeed, the mobile device 500 can generate a digital image based on the image data. Thus, upon selection of the image capture button 606, the mobile device 500 can capture a front-side image of the check 604 (shown in FIG. 6A) and/or a back-side image of the check 604 (shown in FIG. 6B). In one or more embodiments, upon capturing a particular image, the mobile device 500 can provide a preview of the captured image. The mobile device 500 can further provide one or more options that allow the user to either accept the captured image or to re-take the image.

As mentioned, in one or more embodiments, the mobile device 500 provides the viewfinder display 602 upon selection of a button provided within a check deposit element. The mobile device 500 can label or classify a captured image based on the button selected. For example, upon detecting user selection of the first button 518 of FIG. 5, the mobile device 500 can provide the viewfinder display 602 and designate an image captured by the viewfinder display 602 as a front-side image of the check 604. Similarly, upon detecting user selection of the second button 520 of FIG. 5, the mobile device 500 can provide the viewfinder display 602 and designate an image captured by the viewfinder display 602 as a back-side image of the check 604.

In some embodiments, however, the mobile device 500 provides the viewfinder display 602 automatically in response to receiving the check deposit trigger. The mobile device 500 can instruct the user to capture the required images of the check 604 accordingly. For example, in addition to the viewfinder display 602 (or as part of the viewfinder display 602), the mobile device 500 can provide instructions (e.g., a caption) that indicate that the first captured image of the check will be designated as a front-side image. Upon detecting that a satisfactory front-side image of the check 604 has been captured, the mobile device 500 can automatically provide additional instructions that indicate that the next captured image of the check 604 will be designated as a back-side image.

Notably, as shown in FIGS. 6A-6B, a user can use the mobile device 500 to capture images of the check 604 during the video chat. Indeed, in one or more embodiments, the mobile device 500 continues to provide the video chat conducted between the mobile device and the support terminal on the first pane 508 of the dual pane display 502 while the user utilizes the mobile device 500 to capture images of the check. Thus, a support representative utilizing the support terminal can continue to provide guidance to the user of the mobile device 500, answer any question of the user, etc.

Figure 7:
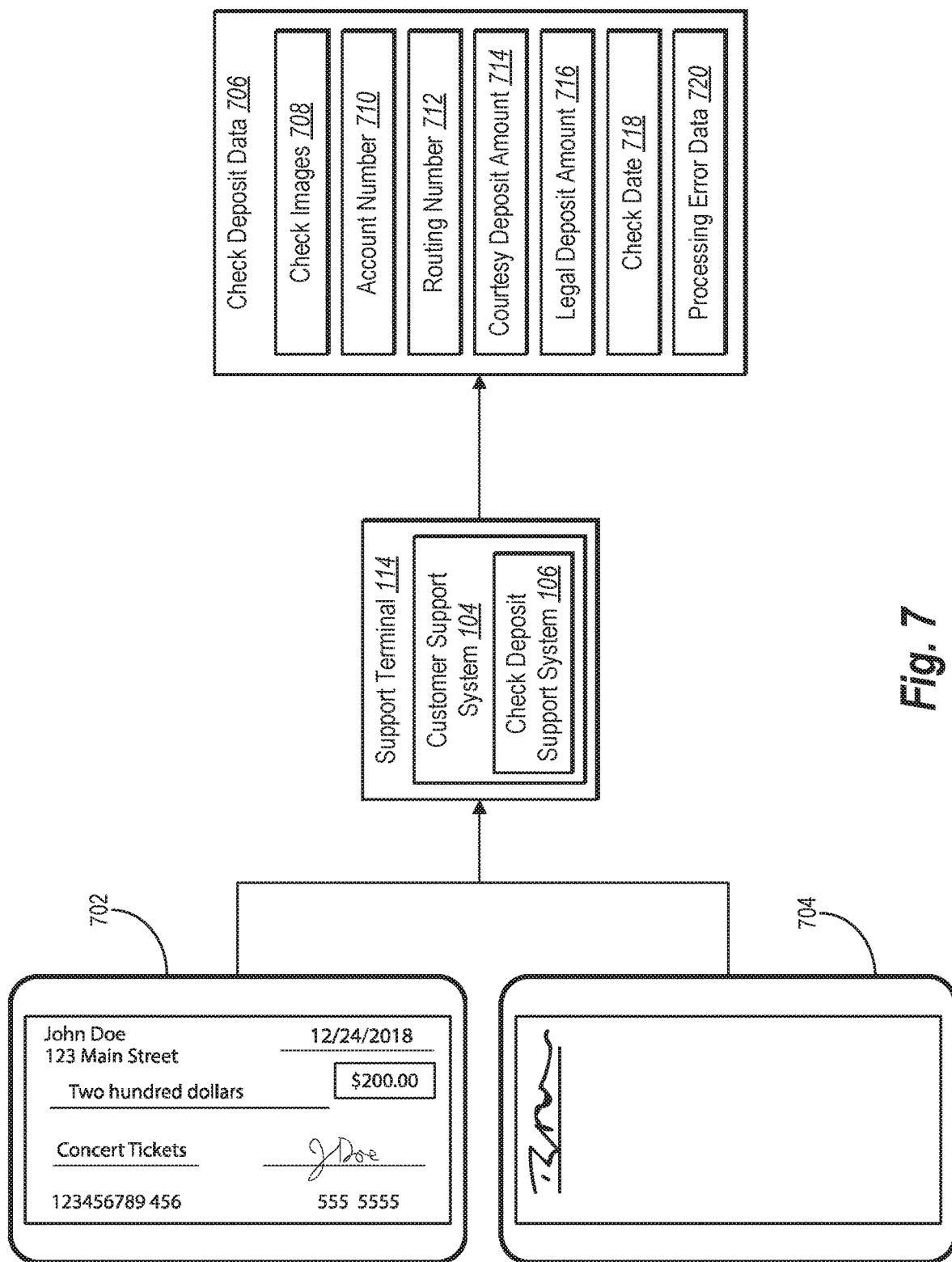
FIG. 7 illustrates a block diagram for identifying check deposit data from images of a check in accordance with one or more embodiments.

After the mobile device 500 captures one or more images of a check (i.e., at least one of a front-side image or a back-side image), the mobile device 500 can transmit the image(s) of the check for deposit. Indeed, the customer support system 104 can receive the image(s) of the check (e.g., at a support terminal or a server). FIG. 7 illustrates a block diagram of the customer support system 104 analyzing images of a check to identify check deposit data in accordance with one or more embodiments.

Indeed, as shown in FIG. 7, the customer support system 104 can receive a front-side image 702 and a back-side image 704 of a check (though, in some embodiments, receiving one image is sufficient). The customer support system 104 can utilize the check deposit support system 106 to analyze the front-side image 702 and the back-side image 704 of the check and identify check deposit data 706. Indeed, as mentioned above, the customer support system 104 can receive and analyze the images of the check at the support terminal 114. In one or more embodiments, the customer support system 104 receives and analyzes the images of the check at a server (e.g., the server(s) 102 of FIG. 1). In some embodiments, the customer support system 104 receives the images of the check at the support terminal 114 or at a server and employs a third-party service (e.g., the third-party system 110 of FIG. 1) to analyze the images of the check.

In one or more embodiments, the customer support system 104 utilizes the check deposit support system 106 to perform various analyses of the front-side image 702 and the back-side image 704. For example, the customer support system 104 can perform Optical Character Recognition to extract one or more data elements from the front-side image 702 and/or the back-side image. To illustrate, the customer support system 104 can perform Optical Character Recognition to identify Magnetic Ink Character Recognition data. Magnetic Ink Character Recognition data can include, but is not limited to, an account number identified on the check (i.e., an account number associated with an account of the entity authorizing the transfer of funds), a routing number identified on the check (i.e., the routing number corresponding to the account number), or any associated errors (e.g., resulting from the characters represented in the images being unreadable). The customer support system 104 can further utilize Optical Character Recognition techniques to perform Courtesy Amount Recognition to identify Courtesy Amount Recognition data (e.g., a courtesy deposit amount included on the check) and/or Legal Amount Recognition to identify Legal Amount Recognition data (e.g., a legal deposit amount included on the check) and identify any associated errors (e.g., the amounts are unreadable in the images, the courtesy deposit amount and the legal deposit amount are different. etc.).

In one or more embodiments, the customer support system 104, via the check deposit support system 106, implements field mapping when performing Optical Character Recognition in order to extract the correct data from the images of the check. In other words, the customer support system 104 determines that areas of a check contain specific information and then identifies the information extracted from the images of the check based on the area from which the information was extracted. For example, the customer support system 104 can determine that the images of a check correspond to a personal check, and therefore the routing number and the account number are positioned before the check number. As another example, the customer support system 104 can determine that the images of a check correspond to a business check, and therefore the routing number and the account number are positioned after the check number. Thus, the customer support system 104 can identify desired data based on the area of the check as well as the type of check.

In one or more embodiments, the customer support system 104 can further utilize the check deposit support system 106 to edit the front-side image 702 and/or the back-side image 704 of the check (e.g., crop the image(s), reformat the image(s) as needed, etc.). In some embodiments, the customer support system 104 can utilize the check deposit support system 106 to extract a date of the check and identify any associated errors (e.g., the date is in the future or is older than a certain allowed threshold). In some embodiments, the customer support system 104 can utilize the check deposit support system 106 to scan the front-side image 702 and/or the back-side image 704 to determine overall image quality (e.g., before identifying the check deposit data 706). Upon determining that the image quality for one or both of the images is insufficient, the customer support system 104 can notify the user of the mobile device that new images need to be taken.

As shown in FIG. 7, by analyzing the front-side image 702 and the back-side image 704, the customer support system 104 identifies the check deposit data 706. In particular, the check deposit data 706 includes check images 708 (which may include cropped or reformatted images based on the front-side image 702 and/or the back-side image 704), an account number 710 (i.e., associated with an account of the entity authorizing the transfer of funds), a routing number 712, a courtesy deposit amount 714, a legal deposit amount 716, a check date 718, and processing error data 720 (which can include errors associated with the Magnetic Character Ink Recognition, the Courtesy Amount Recognition, the Legal Amount Recognition, the date included in the check, etc.). In one or more embodiments, the check deposit data 706 includes additional or alternative data elements.

Figure 8:
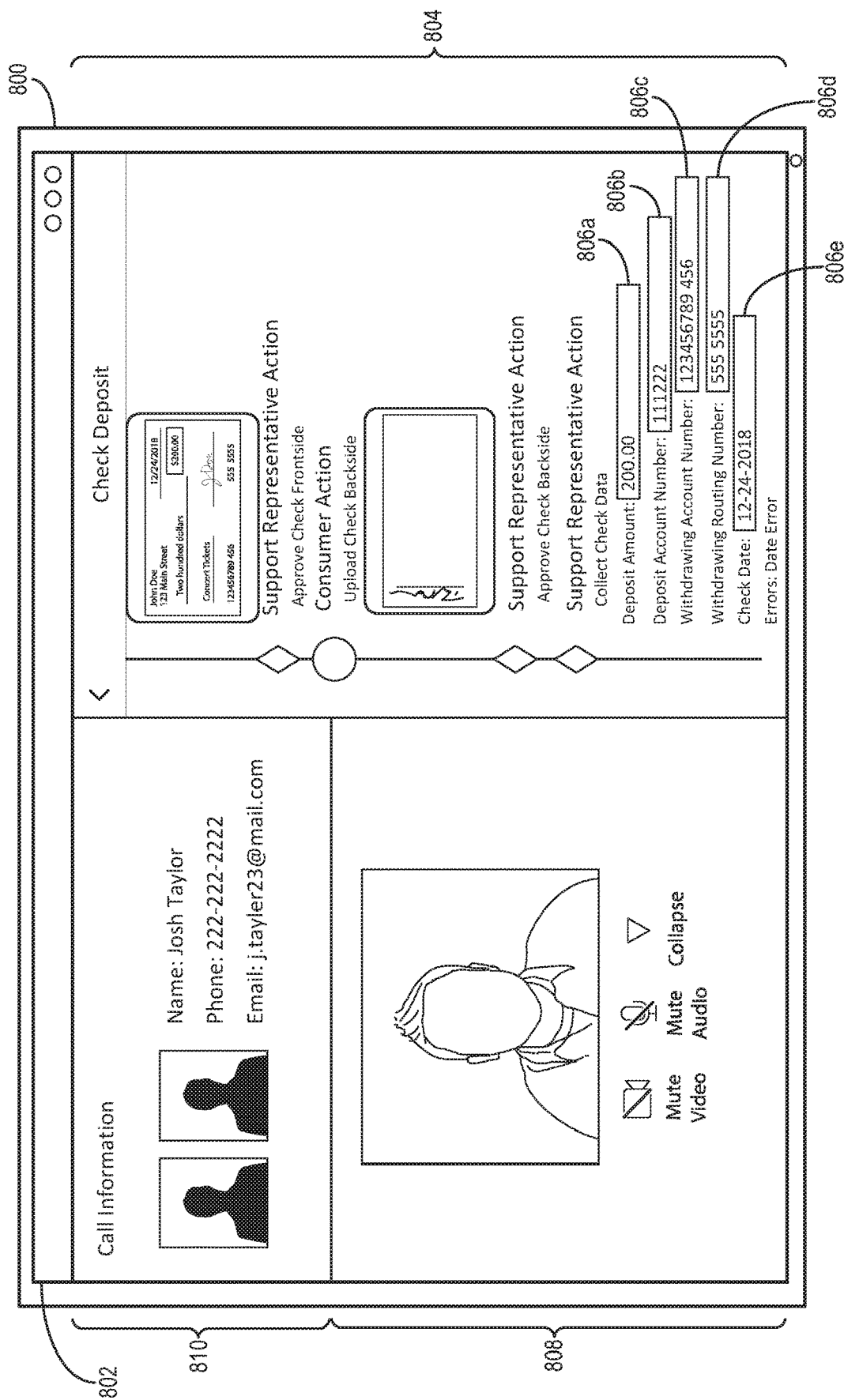
FIG. 8 illustrates a user interface for verifying and/or correcting check deposit data at a support terminal in accordance with one or more embodiments.

As previously mentioned, upon identification of check deposit data (whether identified by the support terminal, a server, or a third-party system), the customer support system 104 can display the check deposit data on the support terminal (e.g., using the check deposit support system 106). FIG. 8 illustrates a support terminal 800 displaying a graphical user interface 802 that provides check deposit data in accordance with one or more embodiments. As shown in FIG. 8, the graphical user interface 802 can include a first pane 804 that displays one or more data elements from the check deposit data (e.g., the check deposit data 706 of FIG. 7). Providing the check deposit data in the graphical user interface 802 allows a support representative to verify the check deposit data before depositing the check.

In addition to verifying the check deposit data identified from the images of the check, the customer support system 104 can further enable the support representative to verify the account to which the deposit amount will be deposited (i.e., the deposit account number). Indeed, in some embodiments, the customer support system 104 identifies the deposit account number from the image(s) of the check (e.g., identifies an account number corresponding to a name written on the front-side of the check or signed onto the back-side of the check). In other words, the check deposit data can include the deposit account number. In some embodiments, however, the customer support system 104 identifies the deposit account number based on login information provided by the mobile application on the mobile device accessing the customer support system 104.

In one or more embodiments, the customer support system 104, via the check deposit support system 106, provides functionality for editing the check deposit data within the graphical user interface 802. For example, the customer support system 104 can provide data elements having character and/or numerical values within an editable field, such as the editable fields 806a-806e. In one or more embodiments, the customer support system 104 can provide one or more selectable editing tools within the first pane 804 of the graphical user interface 802 (not shown), allowing the support representative to select a tool and edit one or more data elements accordingly.

As further shown in FIG. 8, the customer support system 104 provides, within the graphical user interface 802, a second pane 808 that displays the video chat. Indeed, the customer support system 104 can display the check deposit data within the graphical user interface 802 during the video chat. By displaying the check deposit data in the first pane 804 and the video chat in the second pane 808, the customer support system 104 enables a support representative to verify and/or edit the check deposit data while communicating with the user via the video chat. Thus, the customer support system 104 allows for the quick verification/correction of the check deposit data, providing assurance to the user that the check is deposited using the correct information.

As shown in FIG. 8, the customer support system 104 further provides, within the graphical user interface 802, a third pane 810 providing information associated with the video chat (e.g., the name of the user with whom the support representative is communicating, the contact information for the user, etc.). This is merely exemplary. In one or more embodiments, the customer support system 104 only displays the first pane 804 and the second pane 808 within the graphical user interface 802. In some embodiments, however, the customer support system 104 displays additional panes as needed.

Figure 9:
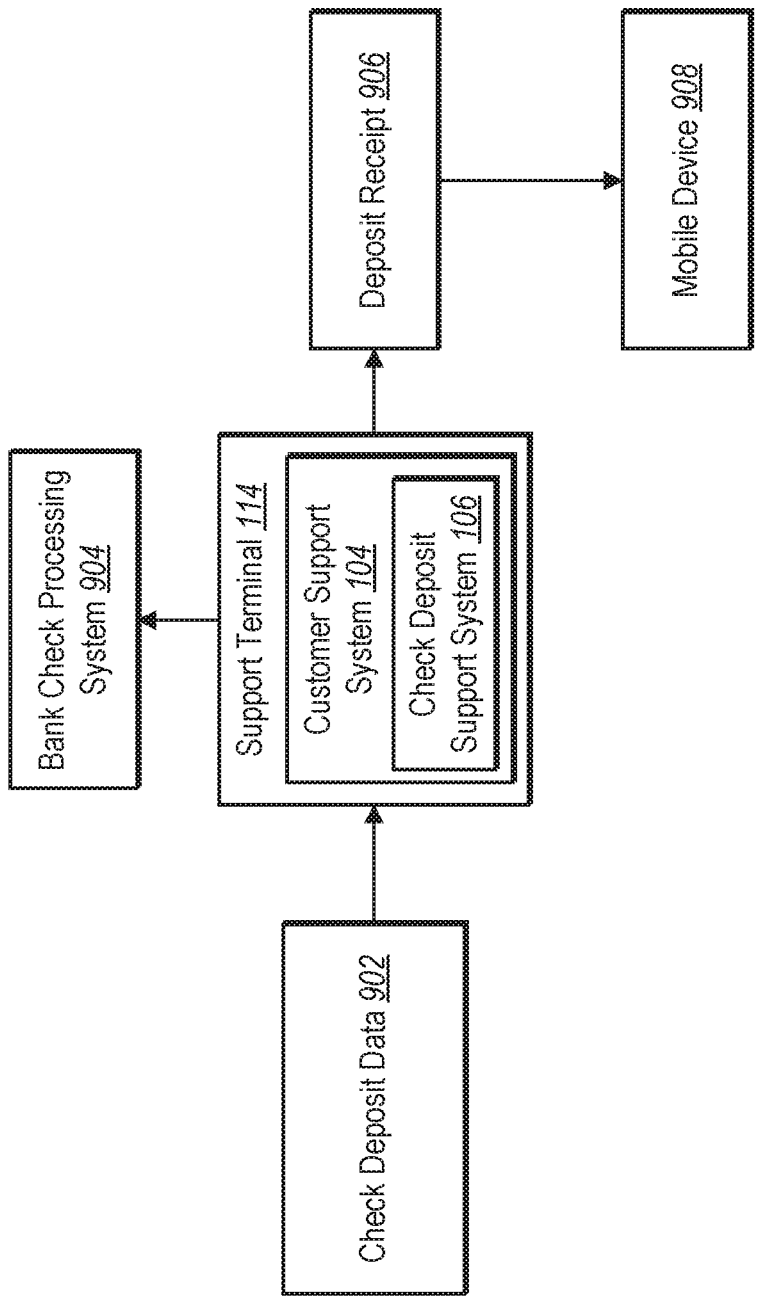
FIG. 9 illustrates a block diagram for depositing a check using check deposit data in accordance with one or more embodiments.

As mentioned above, the customer support system 104 can deposit the check into a user account using the check deposit data. Indeed, the customer support system 104 can utilize the check deposit support system 106 to deposit the check. FIG. 9 illustrates a block diagram of the customer support system 104 depositing a check using check deposit data 902 in accordance with one or more embodiments. As shown in FIG. 9, the customer support system 104 can deposit the check by entering the check deposit data 902 (including the deposit account number) into a bank check processing system 904. In one or more embodiments, the bank check processing system 904 includes a check processing system of the financial institution (e.g., a bank or credit union) associated with the user of the mobile device (i.e., associated with the deposit account number). In one or more embodiments, the customer support system 104 sends the check deposit data 902 to a banking system associated with the account authorizing the transfer of funds (i.e., the account from which the funds will be withdrawn).

As shown in FIG. 9, the customer support system 104 can, via the check deposit support system 106, generate a deposit receipt 906 based on depositing the check. In one or more embodiment, the customer support system 104 sends the deposit receipt 906 to the mobile device 908. For example, the customer support system 104 can send the deposit receipt 906 to a mobile application installed on the mobile device 908 and/or to an email address associated with the user of and accessible by the mobile device 908. In one or more embodiments, the customer support system 104 transmits the deposit receipt 906 to the mobile device 908 via the second connection between the support terminal 114 and the mobile device 908 (e.g., the connection used by the support terminal 114 to push display element triggers to the mobile device 908). In one or more embodiments, upon receiving the deposit receipt 906, the mobile device 908 provides the deposit receipt 906 in the second pane as an overlay over the check deposit element. As discussed above, the mobile device 908 can modify the size of the second pane based on the size of the deposit receipt 906.

It will be appreciated that the customer support system 104 can similarly use images of a check to perform functions other than transferring funds from one account to another. For example, the customer support system 104 can also utilize the images of a check to open a new account at a financial institution and fund the account with the funds authorized by the check. Further, the customer support system 104 can utilize the images of the check to make a payment (e.g., a pay a bill) using funds authorized by the check.

Figure 10:
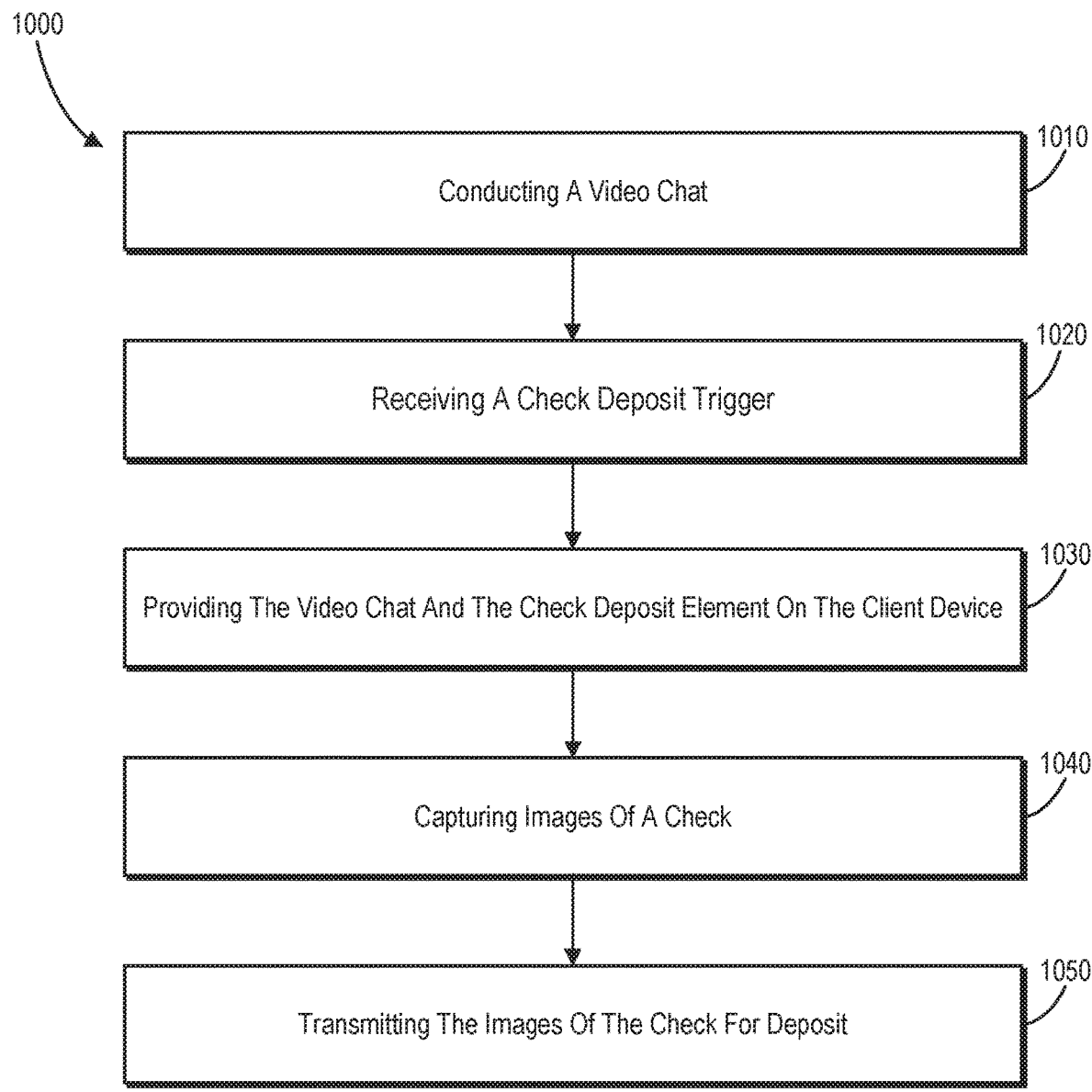
FIG. 10 illustrates a flowchart of a series of acts in a method of submitting images of a check for deposit during a video chat in accordance with one or more embodiments.

Turning now to FIG. 10, this figure illustrates a series of acts 1000 for transmitting images of a check, by a client device, for deposit during a video chat. While FIG. 10 illustrates acts according to one embodiment, alternative embodiments may omit, add to, reorder, and/or modify any of the acts shown in FIG. 10. The acts of FIG. 10 can be performed as part of a method. In one or more embodiments, a non-transitory computer-readable medium can store instructions that, when executed by at least one processor, cause a computing device to perform the acts of FIG. 10. In still further embodiments, a system can perform the acts of FIG. 10.

The series of acts 1000 includes an act 1010 of conducting a video chat. For example, the act 1010 involves conducting a video chat between a client device and a support terminal, the video chat transmitted through a first connection. Conducting the video chat can include establishing the first connection between the client device and the support terminal (e.g., establishing a peer-to-peer connection or establishing a connection via a server, as discussed above). Conducting the video chat can also include maintaining the first connection between the client device and the support terminal and transmitting the video chat via the first connection.

The series of acts 1000 also includes an act 1020 of receiving a check deposit trigger. For example, the act 1020 involves receiving a check deposit trigger pushed through a second connection by the support terminal. In one or more embodiments, the second connection is established via a Websocket server, enabling the support terminal to push display element triggers to the client device. In one or more embodiments, receiving the check deposit trigger includes receiving the corresponding check deposit element itself. In some embodiments, however, the client devices retrieves, renders, or otherwise obtains the check deposit element in response to receiving the check deposit trigger.

Additionally, the series of acts 1000 includes an act 1030 of providing the video chat and the check deposit element on the client device. For example, the act 1030 involves, in response to receiving the check deposit trigger, providing, on a display of the client device, the video chat between the client device and the support terminal in a first pane and a check deposit element in a second pane. In one or more embodiments, the client device comprises a mobile device. Accordingly, providing, on the display of the client device, the video chat between the client device and the support terminal in the first pane and the check deposit element in the second pane can include providing the first pane and the second pane within a mobile application of the mobile device.

In one or more embodiments, based on receiving the check deposit trigger pushed through the second connection, the client device activates a camera of the client device. Accordingly, the client device can display, within the check deposit element, a viewfinder display providing a representation of image data captured by the camera of the client device. As mentioned above, however, some embodiments involve providing buttons within the check deposit element and providing a viewfinder display in response to a user selection of one of the buttons. In some embodiments, activating the camera of the client device comprises providing, at the client device, a selectable option for selecting among a plurality of cameras of the client device; receiving a user interaction at the client device selecting one camera from the plurality of cameras of the client device; and activating the camera of the client device based on the user interaction.

As described above, in some embodiments, the client device divides a display of the client device based on a separate display trigger. Indeed, in one or more embodiments, the client device receives, from the support terminal, a display trigger during the video chat. In response to receiving the display trigger, the client device can divide the display of the client device into at least the first pane and the second pane. Accordingly, the client device can provide the video chat between the client device and the support terminal in the first pane and the check deposit element in the second pane further in response to dividing the display.

Further, the series of acts 1000 includes an act 1040 of capturing images of a check. For example, the act 1040 involves, during the video chat, capturing one or more images of a check utilizing the check deposit element. In one or more embodiments, capturing the one or more images of the check utilizing the check deposit element comprises capturing at least one of a front-side image of the check or a back-side image of the check using the viewfinder display during the video chat.

The series of acts 1000 also includes an act 1050 of transmitting the images of the check for deposit. For example, the act 1050 involves, during the video chat, transmitting the one or more images of the check for deposit by the support terminal.

In one or more embodiments, the series of acts 1000 further include acts for receiving a deposit receipt associated with the deposit of the check. For example, the series of acts 1000 can include acts for receiving a deposit receipt pushed through the second connection by the support terminal during the video chat; and providing the deposit receipt in the second pane as an overlay over the check deposit element. The series of acts 1000 can also include an act for modifying a size of the second pane based on a size of the deposit receipt.

In some embodiments, the client device can transmit images associated with a plurality of checks for deposit. Accordingly, the series of acts 1000 can include acts for, during the video chat, capturing one or more additional images of one or more additional checks utilizing the check deposit element; and transmitting the one or more additional images of the one or more additional checks for deposit by the support terminal.

Figure 11:
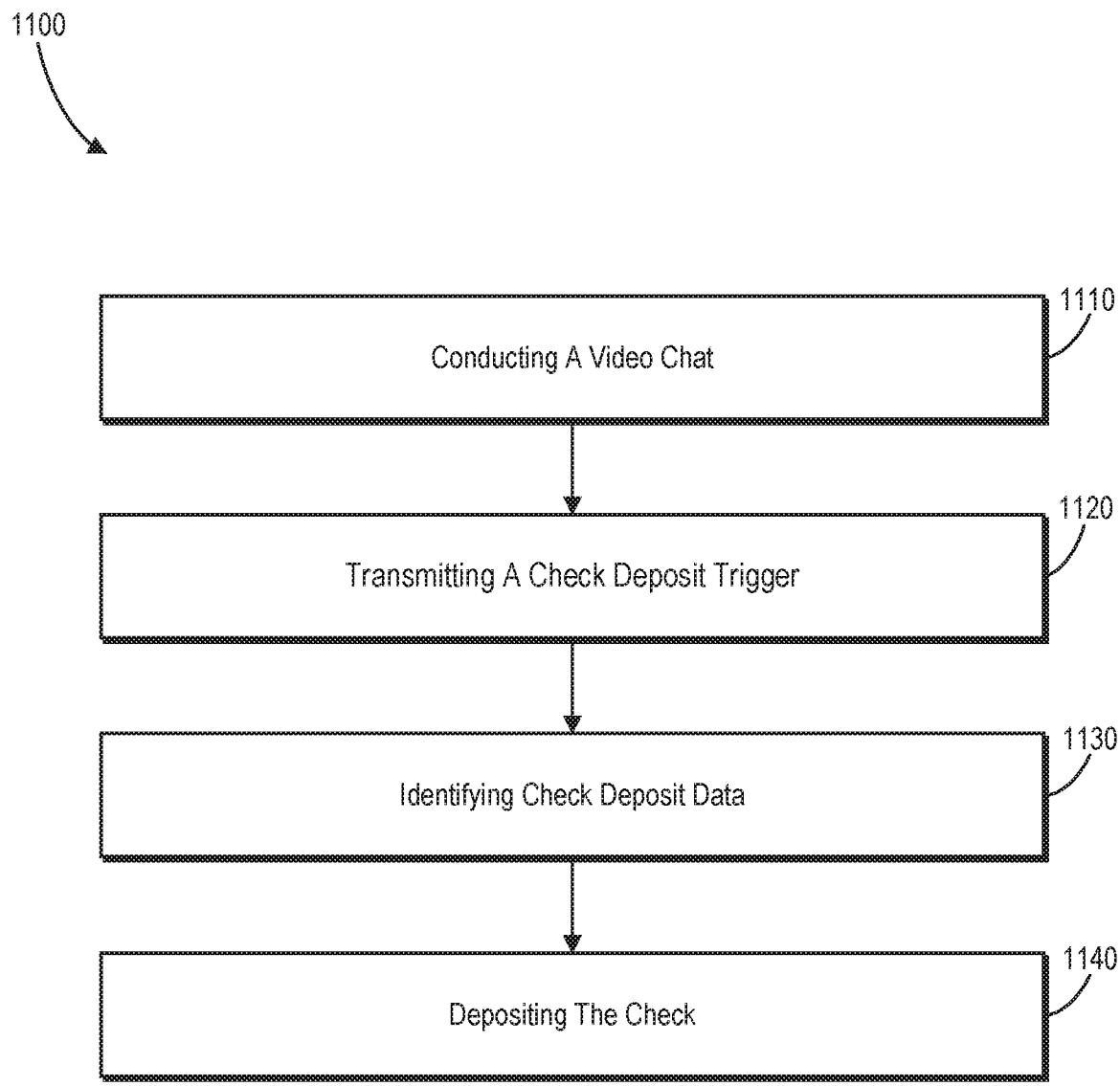
FIG. 11 illustrates a flowchart of a series of acts in a method of depositing a check during based on images provided by a client device during a video chat in accordance with one or more embodiments.

Turning now to FIG. 11, this figure illustrates a series of acts 1100 for depositing a check, by a support terminal (or a server), during a video chat. While FIG. 11 illustrates acts according to one embodiment, alternative embodiments may omit, add to, reorder, and/or modify any of the acts shown in FIG. 11. The acts of FIG. 11 can be performed as part of a method. In one or more embodiments, a non-transitory computer-readable medium can store instructions that, when executed by at least one processor, cause a computing device to perform the acts of FIG. 11. In still further embodiments, a system can perform the acts of FIG. 11.

The series of acts 1100 includes an act 1110 of conducting a video chat. For example, the act 1110 involves conducting a video chat between a client device and a support terminal, the video chat transmitted through a first connection. As mentioned above with reference to FIG. 10, conducting a video chat can include establishing and maintaining the first connection as well as transmitting the video chat through the first connection.

The series of acts 1100 also includes an act 1120 of transmitting a check deposit trigger. For example, the act 1120 involves transmitting, to the client device through a second connection, a check deposit trigger to cause division of a display of the client device into at least a first pane displaying the video chat and a second pane displaying a check deposit element. As mentioned above with reference to FIG. 10, the second connection can be established via a Websocket server that allows the support terminal to push the check deposit trigger.

The series of acts 1100 further includes an act 1130 of identifying check deposit data. For example, the act 1130 involves, during a video chat, identifying check deposit data corresponding to one or more images of a check captured using the check deposit element. In one or more embodiments, identifying the check deposit data corresponding to the one or more images of the check comprises providing the one or more images of the check to a server for data extraction; and receiving the check deposit data corresponding to the one or more images of the check from the server.

In one or more embodiments, the check deposit data comprises at least one of: an account number; a routing number; a courtesy deposit amount; a legal deposit amount; a check date corresponding to the check; or processing error data. In one or more embodiments, the check deposit data comprises the processing error data. Accordingly, the series of acts 1100 can also include acts for receiving, at the support terminal, user input corresponding to the error data; and modifying the check deposit data based on the user input.

Additionally, the series of acts 1100 includes an act 1140 of depositing the check. For example, the act 1140 involves, during the video chat, depositing the check in a user account using the check deposit data.

In one or more embodiments, the series of acts 1100 further include acts for generating a deposit receipt at the support terminal. For example, the series of acts 1100 can include acts for generating a deposit receipt in response to depositing the check; and transmitting the deposit receipt to the client device. In one or more embodiments, the client device comprises a mobile device; and transmitting the deposit receipt to the client device comprises transmitting the deposit receipt to a mobile application of the mobile device.

In some embodiments, the series of acts 1100 includes acts for depositing a plurality of checks during the video chat. For example, the series of acts 1100 can include acts for, during the video chat, receiving additional check deposit data corresponding to one or more additional images of one or more additional checks captured using the check deposit element; and depositing the one or more additional checks in one or more user accounts identified from the one or more additional checks using the additional check deposit data.

As mentioned above, a mobile device can display various display elements (i.e., in addition, or as an alternative to, a check deposit element). Indeed, the mobile device can display the display elements in a dual pane display during a video chat. FIGS. 12A-12E provide various exemplary embodiments of a mobile device 1200 displaying a dual pane display 1202 in which the mobile device 1200 displays a display element (i.e., one of the display elements 1204a-1204e) concurrently with a video chat.

As discussed above with reference to FIG. 5, and as illustrated in FIGS. 12A-12E, the mobile device 1200 divides the mobile device display screen 1206 into a first pane 1208 and a second pane 1210 (in alternative embodiments there may be more than two panes). As illustrated, the mobile device 1200 provides the video chat in the first pane 1208 and one of the display elements 1204a-1204e in the second pane 1210. Alternatively, the mobile device 1200 may divide the display screen 1206 into three or more panes in response to receiving multiple display elements simultaneously or in response to receiving a display element formatted to use multiple panes.

Figure 12A:
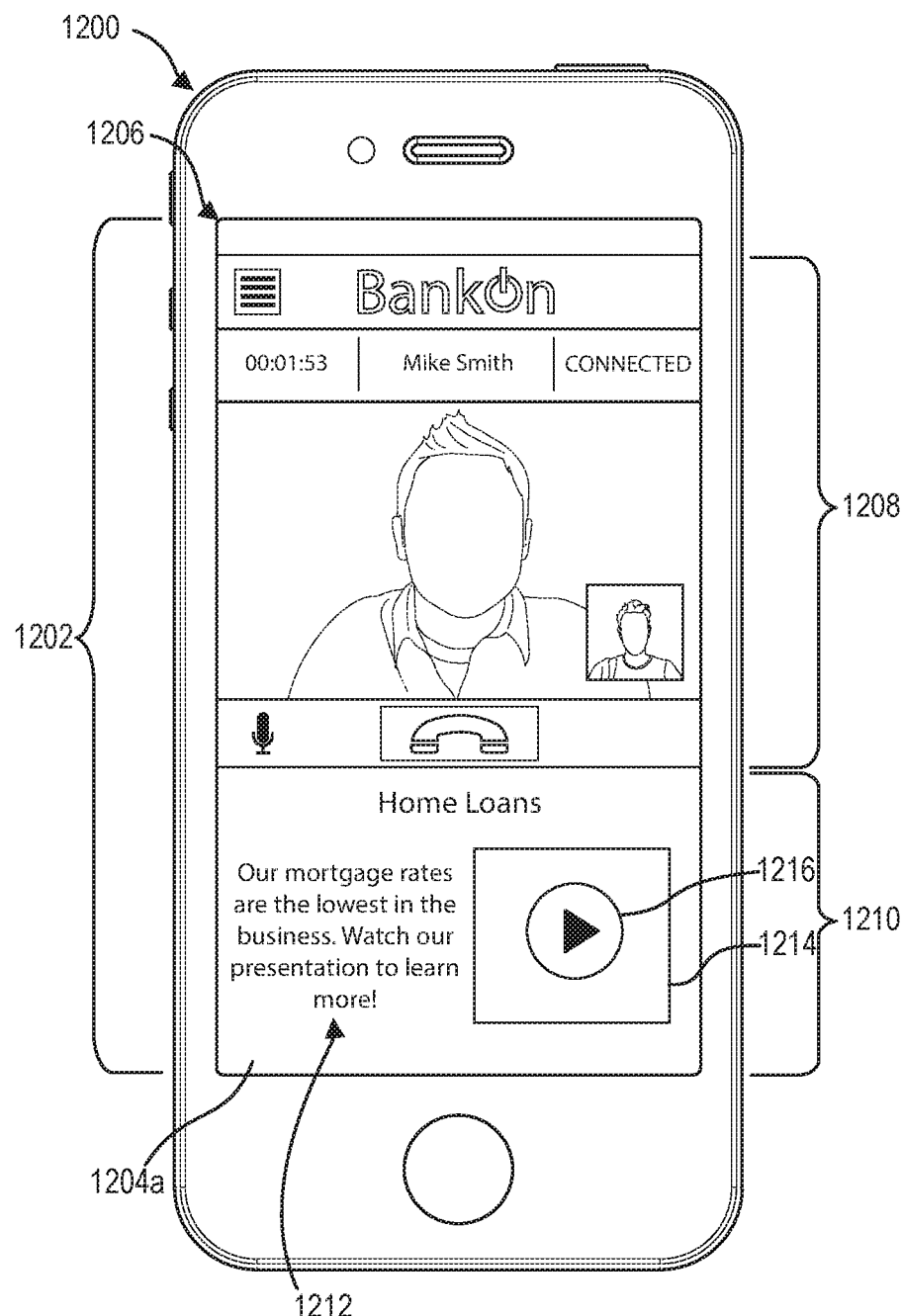
FIGS. 12A-12E illustrate a mobile device displaying various views of a dual pane display in accordance with one or more embodiments.

The display element 1204a illustrated in FIG. 12A is an informational slide comprising a text portion 1212 and a video portion 1214. The display element 1204a provides exemplary information regarding a banking service provided by the mobile application. By way of illustration, the display element 1204a displays information regarding mortgage rates.

The video portion 1214 plays an informational video in response to a user interaction. For example, the video portion 1214 plays the video in response to detecting a user selection of a play button 1216. Additionally, or alternatively, the video portion 1214 may play the video in response to detecting a user swiping gesture or a user voice command. Alternatively, the video portion 1214 may play the video immediately after the display element 1204a is displayed on the second pane 1210. One or more alternative embodiments may comprise an informational display element comprising only an informational slide or document or only an informational video. Additionally, or alternatively, the informational slide can comprise images separate from or in addition to any informational text.

Figure 12B:
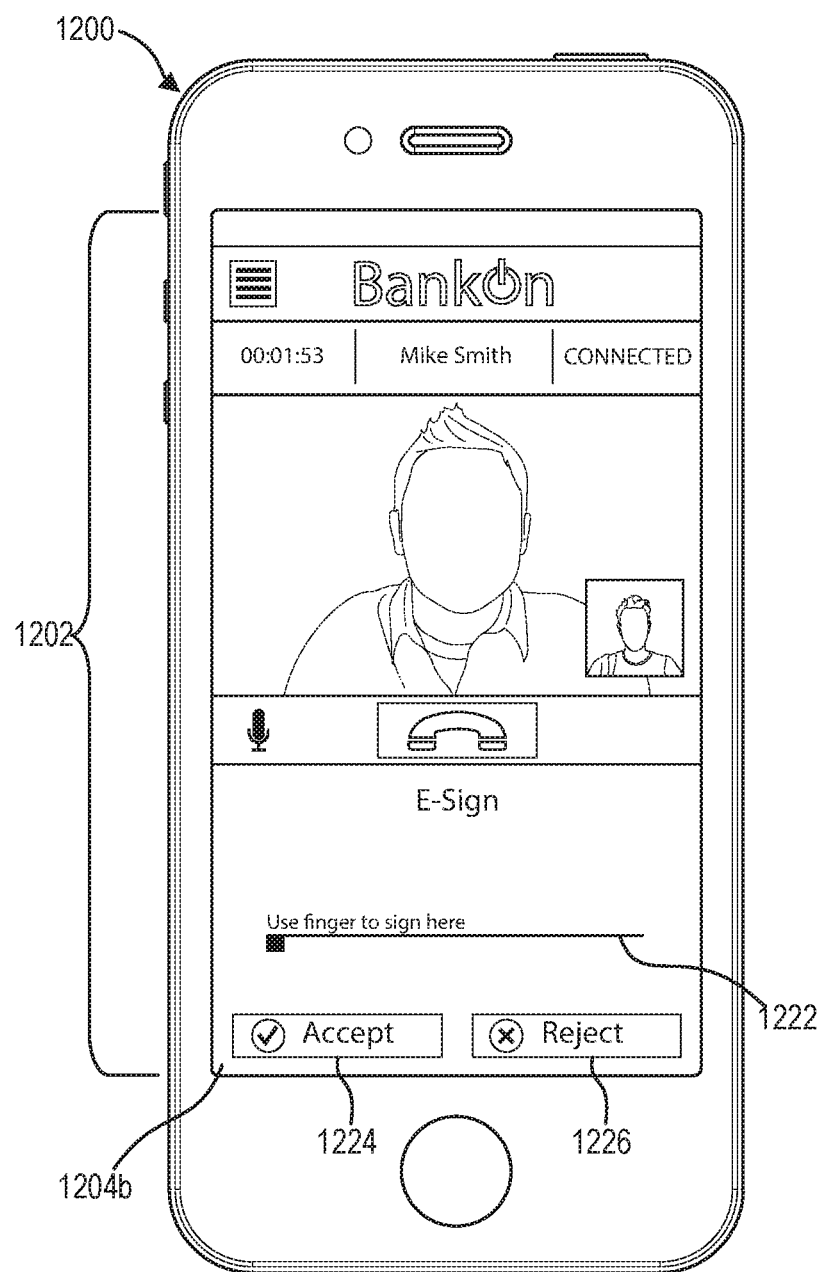

FIG. 12B illustrates yet another embodiment of the mobile device 1200 displaying a dual pane display 1202. In particular, the mobile device 1200 provides a display element 1204b in the second pane 1210 that is a signature pad enabling a user to enter a signature. In particular, the display element 1204b comprises a signature line 1222, an accept button 1224, and a reject button 1226. The display element 1204b changes, in response to detecting a user interaction along the signature line 1222, a signature of the mobile device user. For example, a user may use a finger or a stylus to enter a signature upon the signature line 1222. After entering the signature, the mobile device user may select to accept or reject the signature. Upon detecting a selection of the accept button 1224, the signature is sent to the support terminal. Upon detecting a selection of the reject button 1226, the signature line 1222 is cleared for the mobile device user to sign again.

Figure 12C:
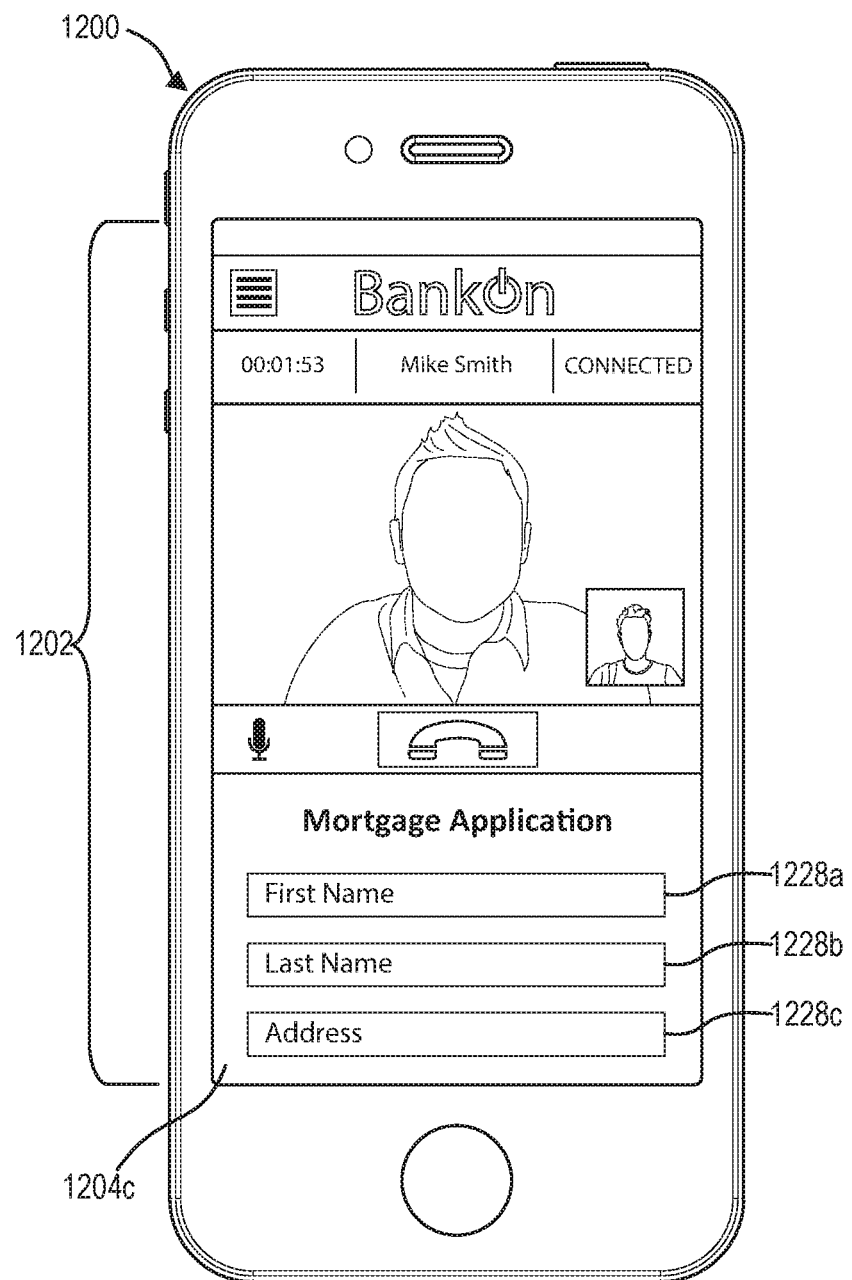

FIG. 12C illustrates yet another embodiment of the mobile device 1200 displaying a dual pane display 1202. In particular, the mobile device 1200 provides a display element 1204c in the second pane 1210 that is a fillable form that enables the mobile device user to enter input into the form. In particular, the display element 1204c comprises fillable lines 1228a-1228c. By way of illustration, fillable lines 1228a-1228c instruct a user to input a first name, a last name, and an address, respectively; but it will be appreciated that the display element 1204c may instruct a user to input other types of information as well. For example, the display element 1204c may ask for a user's birthday, state of residence, or driver's license number.

Upon detecting a user selection of one of fillable lines 1228a-1228c, the display element 1204c presents the mobile device user with an alphanumeric keypad for entering information into the corresponding line. Additionally, or alternatively, display element 1204c may present the user with a list of optional inputs where there are a limited number of inputs available or acceptable. For example, if a fillable line instructed a user to input a state of residence, upon selecting that fillable line to input the information, the display element 1204c may present the user with a list of states that may be chosen for input. Additionally, or alternatively, the display element 1204c may accept information through voice command, wherein the user may vocally input the information requested.

It will also be appreciated by one of skill in the art that the fillable form of the display element 1204c may require information in addition to what may be displayed on a single pane. Therefore, in one or more embodiments, the display element 1204c may be scrollable, wherein a user may scroll in a direction of information or fillable lines in addition to those currently presented so the additional fillable lines may be viewed and interacted with to enter information. Alternatively, the display element 1204c may provide a fillable form on multiple pages and present a user with button options to view a subsequent or previous page of fillable lines and information.

Figure 12D:
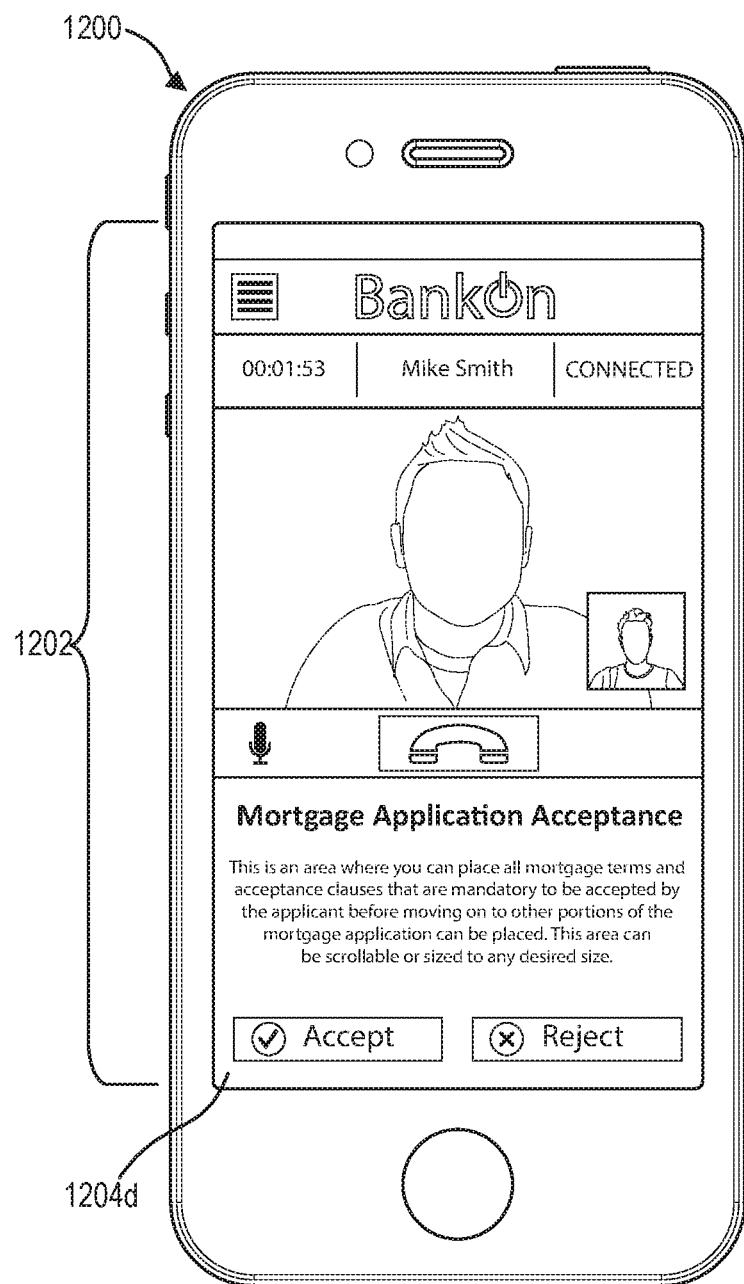

FIG. 12D illustrates yet another embodiment of the mobile device 1200 displaying a dual pane display 1202. In particular, the mobile device 1200 provides a display element 1204d in the second pane 1210 comprising terms and acceptance clauses accompanied by an option to accept or reject the terms.

Figure 12E:
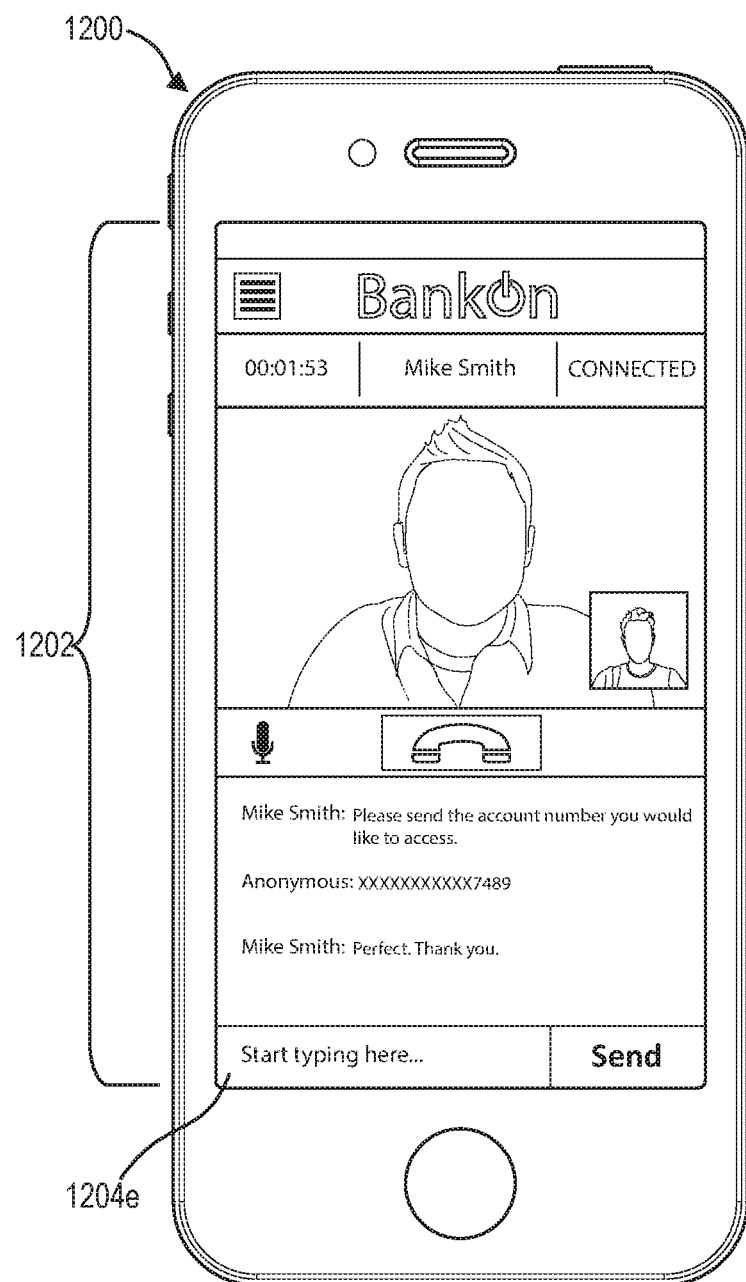

FIG. 12E illustrates yet another embodiment of the mobile device 1200 displaying a dual pane display 1202. In particular, the mobile device 1200 provides a display element 1204e in the second pane 1210, which is a text-based messaging interface enabling a user to enter in and send a text-based message to a support terminal. Additionally, the display element 1204e may receive and display text-based messages from the support terminal.

It will be appreciated by one skilled in the art that a display element may comprise elements of the display elements 1204a-1204e—as well as the display element 504 of FIG. 5—individually or in combination with one or more other display elements. For example, in one or more embodiment the support terminal can generate and send a computer-readable code, such as a bar code or a Quick Response Code. The computer-readable code, when scanned, can cause another device to perform an action. For example, the computer-readable code, when scanned by an ATM, can cause the ATM to disperse a predetermined amount of funds.

It will also be appreciated, as discussed above, that a display element may comprise more information or modifiable elements than can be presented on a single pane. Therefore, in one or more embodiments, the display elements 1204a-1204e—as well as the display element 504 of FIG. 5—may be scrollable, wherein a user may scroll in a direction where information or modifiable elements in addition to those currently presented may be viewed and interacted with to enter information. Alternatively, the display elements 1204a-1204e—as well as the display element 504 of FIG. 5—may provide information or interactive elements on multiple pages and present a user with button options to view a subsequent or previous page.

Figure 13:
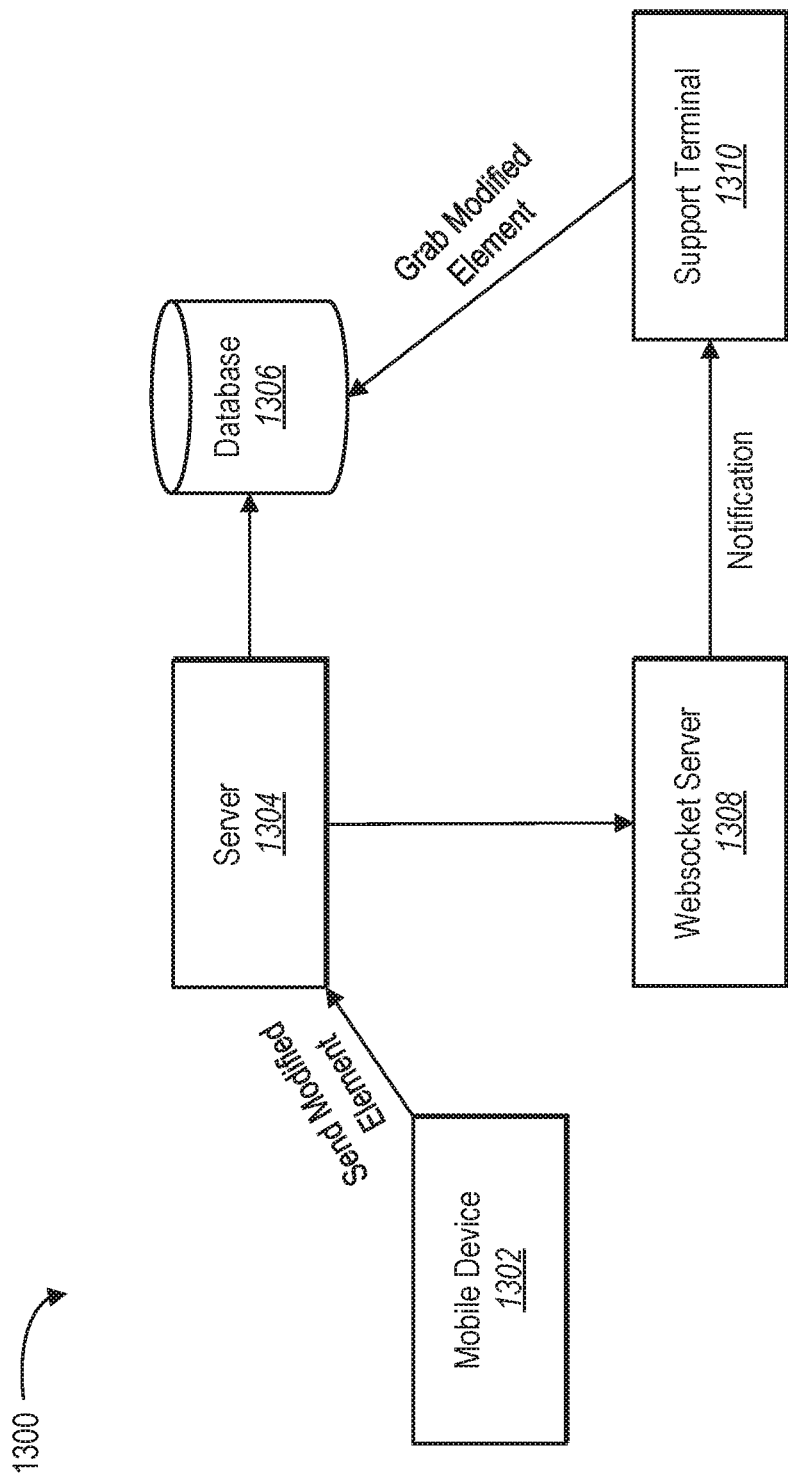
FIG. 13 illustrates a schematic diagram of a system used to send a modified display element in accordance with one or more embodiments.

FIG. 13 illustrates an example implementation of a system 1300 used to send a modified display element to a support terminal. In one or more embodiments, the system 1300 comprises components used in the environment 100 of FIG. 1 and the environment 100 can perform the same operations as the system 1300. In other words, the customer support system 104 operates within the environment 100 to implement the system 1300. As illustrated in FIG. 13 the system 1300 comprises a mobile device 1302, a server 1304, a database repository 1306, a WebSocket server 1308, and a support terminal 1310.

The system 1300 establishes a connection between the mobile device 1302 and the database repository 1306 through the server 1304. In one or more embodiments, the connection is a third connection different from a first connection used to establish a video chat between the mobile device 1302 and the supporter terminal 1310 and different from a second connection used to enable the support terminal 1310 to push display elements to the mobile device 1302. The server 1304 enables the mobile device 1302 to securely transmit a modified display element to the database repository 1306. As illustrated in FIG. 13, the server 1304 is a single server. Alternatively, the third connection may be made through a series of servers.

After receiving a modified display element, the server 1304 forwards the modified display element to the database repository 1306 and sends a notification to the support terminal 1310 through the WebSocket server 1308. In one or more alternative embodiments, the notification may be sent to the support terminal 1310 directly from the mobile device 1302. The notification indicates that the database repository 1306 has received the modified display element and provides a location of the element within the database repository 1306 so the support terminal 1310 may grab the modified element. Additionally, or alternatively, the notification may include a link to the location of the modified display element, enabling the support terminal 1310 to quickly acquire the modified element.

The database repository 1306 may comprise a service that allows for the deposit and retrieval of electronic files. For example, the database repository 1306 may be an electronic drop box, email service, or other cloud-based technology that allows electronic file sharing.

Though not explicitly illustrated in FIG. 13, one or more embodiments use the system 1300 to provide notifications and display elements to the mobile device 1302. For example, the server 1304 can send a notification of a task to the mobile device 1302 (e.g., through the WebSocket server 1308). If the user indicates acceptance of the task indicated by the notification, the server 1304 can then retrieve the display element that corresponds to the task from the database 1306 and provide the display element to the mobile device 1302.

As shown by FIG. 13, the system 1300 can utilize cloud hosting (i.e., the database can comprise one or more cloud based servers). This type of cloud hosting allows for flexibility and scalability. New instances of servers can be created quickly and efficiently to ensure the system scales the use of the application as adoption rates increase. Thus, embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
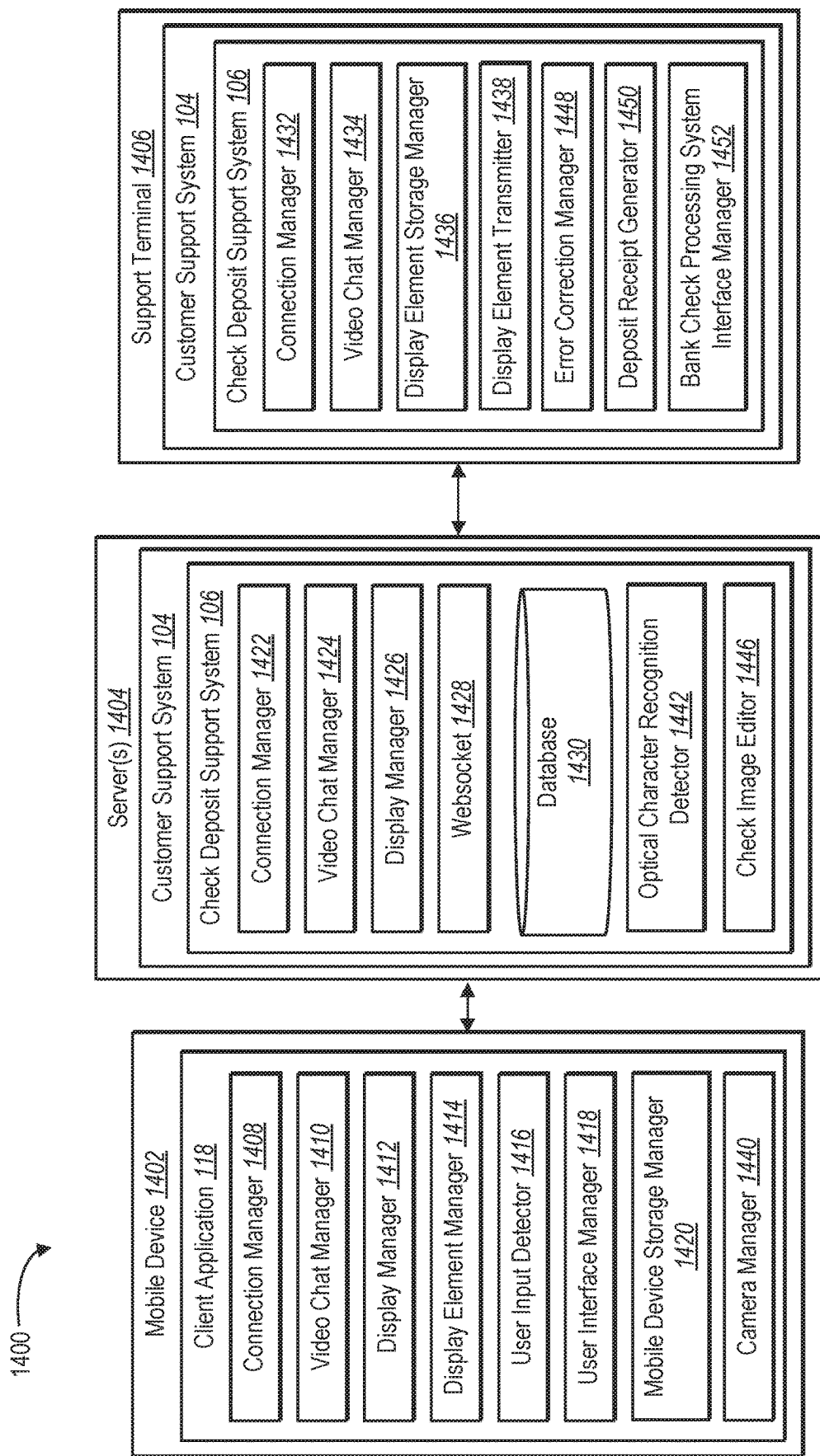
FIG. 14 illustrates a schematic diagram of a system in accordance with one or more embodiments.

Turning now to FIG. 14, additional detail will be provided regarding components and capabilities of one embodiment of the present invention comprising the environment 100 as well as the system 1300. In particular, FIG. 14 illustrates an embodiment of an exemplary system 1400. As shown, the system 1400 may include, but is not limited to, a mobile device 1402, a server(s) 1404, and a support terminal 1406. Moreover, as shown, the mobile device 1402 includes, but is not limited to, a connection manager 1408, a video chat manager 1410, a display manager 1412, a display element manager 1414, a user input detector 1416, a user interface manager 1418, a mobile device storage manager 1420, and a camera manager 1440. Additionally, as shown in FIG. 14, the server(s) 1404 includes, but is not limited to, a connection manager 1422, a video chat manager 1424, a display manager 1426, a WebSocket 1428, a database 1430, an optical character recognition detector 1442, and a check image editor 1446. Though not shown in FIG. 14, it will be appreciated that the support terminal 1406 can include the optical character recognition detector 1442 and the check image editor 1446 as discussed above. Furthermore, as shown in FIG. 14, the support terminal 1406 includes, but is not limited to, a connection manager 1432, a video chat manager 1434, a display element storage manager 1436, a display element transmitter 1438, an error correction manager 1448, a deposit receipt generator 1450, and a bank check processing system interface manager 1452.

As just mentioned, and as illustrated in FIG. 14, the mobile device 1402 includes the connection manager 1408. The connection manager 1408 searches for, detects, identifies, accepts, establishes, monitors, and maintains various types of connections. In particular, the connection manager 1408 establishes and maintains one or more connections between the mobile device 1402 and another device, such as the support terminal 1406. For example, when establishing a video chat between the mobile device 1402 and the support terminal 1406, the connection manager 1408 will establish and maintain a peer-to-peer connection through the duration of a video chat session.

As mentioned, and as illustrated in FIG. 14, the mobile device 1402 also includes the video chat manager 1410. The video chat manager 1410 initiates, provides for display, and maintains a video chat between the mobile device 1402 and another device, such as the support terminal 1406. In particular, the video chat manager 1410 operates in conjunction with the connection manager 1408 to establish and maintain a video chat between the mobile device 1402 and another device, such as the support terminal 1406.

Additionally, the video chat manager 1410 operates in conjunction with a number of user input/output devices, including, but not limited to cameras, microphones, display screens, touchscreens, and keypads.

As mentioned, and as illustrated in FIG. 14, the mobile device 1402 also includes the display manager 1412. The display manager 1412 maintains and changes a display presented on the mobile device 1402. In particular, the display manager 1412 works in conjunction with the user input detector 1416 to change a display of the mobile device in response to detecting a user interaction. Additionally, the display manager 1412 works in conjunction with the user interface manager 1418 to display a graphical user interface.

The display manager 1412 also changes the display of the mobile device 1402 in response to receiving triggering code through a connection to another device. For example, the display manager 1412 may receive triggering code over a connection. In response to receiving the triggering code, the display manager 1412 can divide the display of the mobile device 1402 into multiple panes, enabling the mobile device 1402 to display multiple display items within the multiple panes. As referred to herein, a "display item" refers to a visual component (e.g. character, image, video, or user interface) For example, the mobile device 1402 may be able to display separate mobile applications in the multiple panes or the mobile device may display a video chat in one pane and a display element in another.

Additionally, the display manager 1412 may modify the size of the multiple panes according to the needs of the items displayed within those panes. In particular, the display manager 1412 may increase the size of a pane if the display item within the pane requires more display space.

As mentioned, and as illustrate in FIG. 14, the mobile device 1402 also includes the display element manager 1414. The display element manager 1414 receives, sends, and provides for display elements. In particular, the display element manager 1414 operates in conjunction with the display manager 1412 to display a display element on the mobile device 1402. In one or more embodiments, the display element manager 1414 can render display elements.

Additionally, the display element manager 1414 modifies and maintains display elements. In particular, the display element manager operates in conjunction with the user input detector 1416 to detect a user input. In response to detecting a user input, the display element manager 1414 modifies the display element in accordance to the particular user interaction.

As mentioned, and as illustrated in FIG. 14, the mobile device 1402 also includes the user input detector 1416. The user input detector 1416 detects, identifies, monitors, receives, processes, captures, and/or records various types of user input. For example, the user input detector 1416 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 1416 operates in conjunction with a number of user input devices (in isolation or in combination), mouse devices, keyboards, track pads, or stylus devices. The user input detector 1416 detects and identifies various types of user interactions with user input devices, such as select events, drag events, scroll events, and so forth. For example, the user input detector 1416 detects one or more touch gestures (e.g., swipe gestures, tap gestures, pinch gestures, or reverse pinch gestures) from a user that forms a user interaction.

The user input detector 1416 communicates with, and thus detects user input with respect to, a variety of programs, applications, plug-ins, operating systems, user interfaces, or other implementations in software or hardware.

As mentioned, and as illustrated in FIG. 14, the mobile device 1402 also includes the user interface manager 1418. The user interface manager 1418 provides, manages, and/or controls a graphical user interface (or simply "user interface") for use with the system 1400. In particular, the user interface manager 1418 can facilitate presentation of information by way of an external component of the mobile device 1402. For example, the user interface manager 1418 can display a user interface by way of a display screen associated with the mobile device 1402. The user interface may be composed of a plurality of graphical components, objects, and/or elements that allow a user to perform a function. The user interface manager 1418 presents, via the mobile device 1402, a variety of types of information, including text, images, video, audio, characters, or other information. Moreover, the user interface manager 1418 provides a variety of user interfaces specific to a variety of functions, programs, applications, plug-ins, devices, operating systems, and/or components of the mobile device 1402.

The user interface manager 1418 can provide a user interface with regard to a variety of operations or applications. For example, the user interface manager 1418 provides a user interface that facilitates selecting, identifying, searching, or downloading digital files. Similarly, the user interface manager 1418 can generate a user interface that facilitates managing, editing, modifying, downloading, uploading, or sending digital images. Additional details with respect to various example user interface elements are described throughout with regard to various embodiments containing user interfaces.

In addition, as illustrated in FIG. 14, the mobile device 1402 also includes the mobile device storage manager 1420. The mobile device storage manager 1420 maintains data for the system 1400. The mobile device storage manager 1420 can maintain data of a type, size, or kind, as necessary to perform the functions of the system 1400.

Additionally, as illustrated in FIG. 14, the mobile device 1402 also includes the camera manager 1440. The camera manager 1440 controls operation of one or more cameras of the mobile device 1402. For example, the camera manager 1440 can activate a camera of the mobile device 1402 and capture images using the camera of the mobile device 1402.

Furthermore, as illustrated in FIG. 14, the server(s) 1404 includes the connection manager 1422. The connection manager 1422 searches for, detects, identifies, accepts, establishes, monitors, and maintains various types of connections. In particular, the connection manager 1422 establishes and maintains one or more connections between devices. For example, the connection manager 1422 may establish a connection between the mobile device 1402 and the support terminal 1406.

As mentioned, and as illustrated in FIG. 14, the server(s) 1404 also includes the video chat manager 1424. The video chat manager 1424 establishes, receives, transmits, and maintains a video chat between multiple devices. For example, the video chat manager 1424 may establish and maintain a video chat between the mobile device 1402 and another device, such as the support terminal 1406. In particular, the video chat manager 1424 operates in conjunction with the connection manager 1422 to establish and maintain a video chat across a connection maintained by server(s) 1404.

As mentioned, and as illustrated in FIG. 14, the server(s) 1404 also includes the display manager 1426. The display manager 1426 receives and transmits items for display on devices. In particular, the display manager 1426 can transmit items sent from one device to another device. For example, the display manager 1426 can transmit a display element sent from the support terminal 1406 to be displayed on the mobile device 1402.

As mentioned, and as illustrated in FIG. 14, the server(s) 1404 also includes the WebSocket 1428. The WebSocket 1428 is a bidirectional communication module that enables a device acting as a server to push data to a client device (e.g., the mobile device 1402), rather than waiting for the client device to send a request for data, which the server then fills. In particular, the WebSocket 1428 operates in conjunction with the display manager 1426 to enable a device acting as a server to push items for display to a device acting as a client. For example, the WebSocket 1428 and the display manager 1426 work in conjunction to enable the support terminal 1406 to push a display element for display to the mobile device 1402.

As mentioned, and as illustrated in FIG. 14, the server(s) 1404 also includes the database 1430. The database 1430 operates as a database repository to store data for retrieval. The database 1430 can operate as an electronic cloud storage system (e.g. an electronic drop box). In particular, the database 1430 stores data for retrieval from a device. For example, the database 1430 can store a modified display element received from the mobile device 1402 until it is overwritten or retrieved by the support terminal 1406.

Additionally, as shown in FIG. 14, the server(s) 1404 includes the optical character recognition detector 1442. In particular, the optical character recognition detector 1442 can perform Magnetic Ink Character Recognition on one or more images of a check to identify Magnetic Ink Character Recognition data. Indeed, the optical character recognition detector 1442 can identify an account number and a routing number included on a check based on analyzing the one or more images of the check. The optical character recognition detector 1442 can further identify any associated errors.

The optical character recognition detector 1442 can further perform Legal Amount Recognition and/or Courtesy Amount Recognition on one or more images of a check to identify Legal Amount Recognition data and/or Courtesy Amount Recognition data, respectively. Indeed, the optical character recognition detector 1442 can identify a legal deposit amount and a courtesy deposit amount based on analyzing the one or more images of the check. The optical character recognition detector 1442 can further identify any associated errors.

As shown in FIG. 14, the server(s) 1404 further includes the check image editor 1446. In particular, the check image editor 1446 can edit one or more images of a check received by the server(s) 1404 (e.g., images captured by the mobile device 1402). For example, the check image editor 1446 can crop and/or reformat one or more images of a check.

Furthermore, as illustrated in FIG. 14, the support terminal 1406 includes the connection manager 1432. The connection manager 1432 searches for, detects, identifies, accepts, establishes, monitors, and maintains various types of connections. In particular, the connection manager 1432 establishes and maintains one or more connections between the support terminal 1406 and another device, such as the mobile device 1402. For example, when establishing a video chat between the mobile device 1402 and the support terminal 1406, the connection manager 1432 will establish and maintain a peer-to-peer connection through the duration of the video chat session.

As mentioned, and as illustrated in FIG. 14, the support terminal 1406 also includes the video chat manager 1434. The video chat manager 1434 initiates, provides for display, and maintains a video chat between the support terminal and another device, such as the mobile device 1402. In particular, the video chat manager 1434 operates in conjunction with the connection manager 1432 to establish and maintain a video chat between the support terminal 1406 and another device, such as a mobile device 1402.

Additionally, the video chat manager 1434 operates in conjunction with any number of user input/output devices, including, but not limited to cameras, microphones, display screens, touchscreens, and keypads.

As mentioned, and as illustrated in FIG. 14, the support terminal 1406 also includes the display element storage manager 1436. The display element storage manager 1436 stores display element triggers (and, possibly, display elements) that may be selected and transmitted to another device, such as the mobile device 1402. In particular, the display element storage manager 1436 operates in conjunction with the display element transmitter 1438 and the connection manager 1432 to transmit a display element trigger (and, possibly, a display element) across a connection. As mentioned above, in one or more embodiments, the mobile device 1402 stores the display elements corresponding to the display element triggers.

As mentioned, and as illustrated in FIG. 14, the support terminal 1406 also includes the display element transmitter 1438. The display element transmitter 1438 operates to transmit a display element across a connection to another device. In some embodiments, the display element transmitter 1438 operates to transmit a display element trigger (e.g., a check deposit trigger) across the connection. For example, the display element transmitter 1438 can transmit a display element trigger in conjunction with the corresponding display element.

As further mentioned, and as illustrated in FIG. 14, the support terminal 1406 also includes the error correction manager 1448. In particular, the error correction manager 1448 can operate to correct (i.e., modify) check deposit data at the support terminal 1406. For example, the error correction manager 1448 can provide error correction tools within a graphical user interface presented by the support terminal 1406 that allows a user of the support terminal 1406 to edit check deposit data as needed.

As mentioned, and as illustrated in FIG. 14, the support terminal 1406 further includes the deposit receipt generator 1450. In particular, the deposit receipt generator 1450 can generate a deposit receipt based on the deposit of one or more checks. The deposit receipt generator 1450 can further operate to transmit the deposit receipt to the client device depositing the check(s).

Further, as mentioned, and as illustrated in FIG. 14, the support terminal 1406 includes the bank check processing system interface manager 1452. In particular, the bank check processing system interface manager 1452 can interact with a bank check processing system for further processing of a deposited check. For example, in one or more embodiments, the bank check processing system interface manager 1452 transmits a deposited check to a bank check processing system of the financial system to which the authorized funds will be deposited or from which the authorized funds will be withdrawn.

Figure 15:
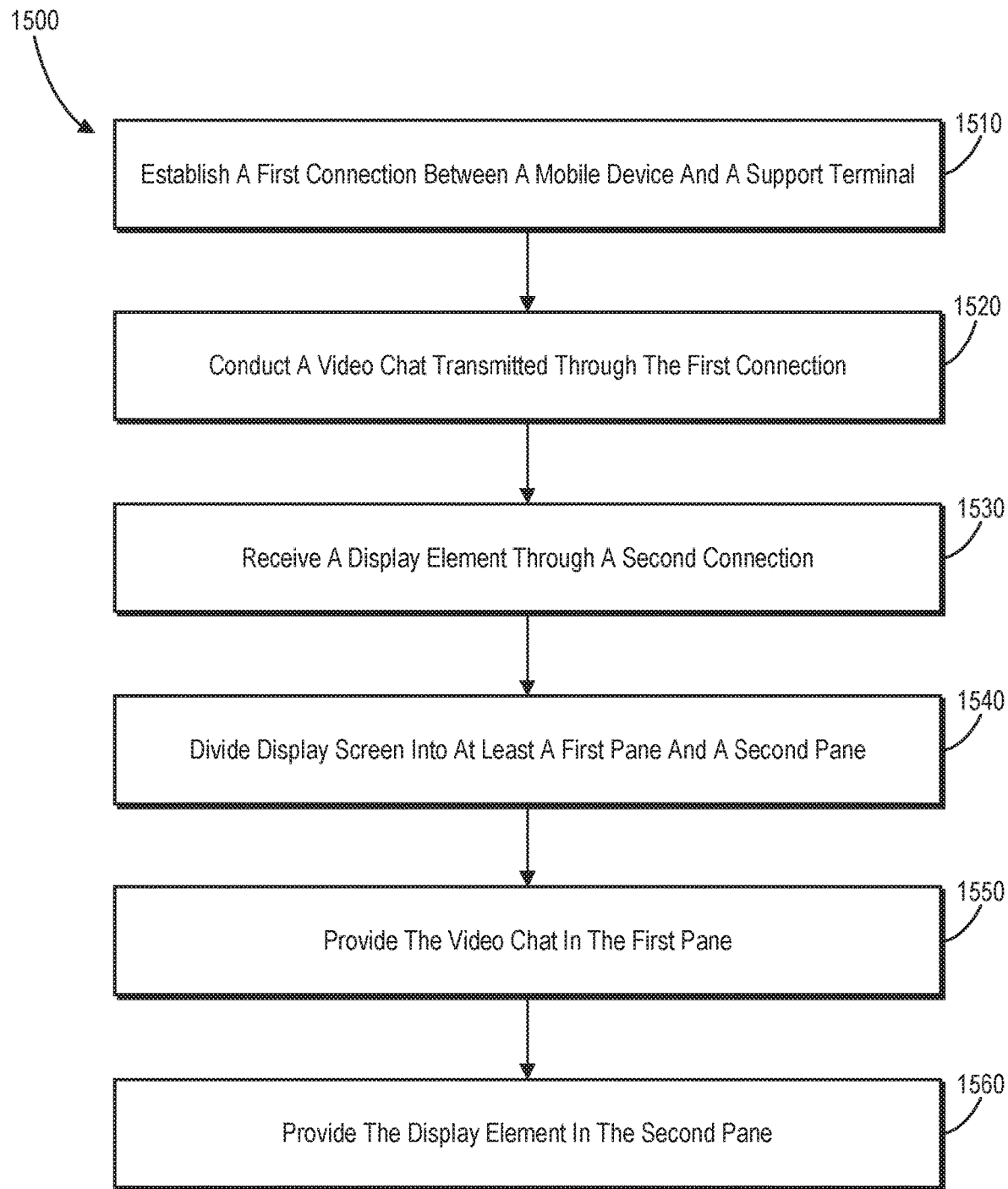
FIG. 15 illustrates a flowchart of a series of acts in a method of implementing a dual pane display in accordance with one or more embodiments.

FIG. 15 illustrates a flowchart of a series of acts 1500 of implementing a dual pane display on a mobile device in accordance with one or more embodiments of the present invention. While FIG. 15 illustrates acts according to one embodiment, alternative embodiments may omit, add to, reorder, and/or modify any of the acts shown in FIG. 15. The acts of FIG. 15 can be performed as part of a method. In one or more embodiments, a non-transitory computer readable storage medium can comprise instructions that, when executed by one or more processors, cause a computing device to perform the acts of FIG. 15. In still further embodiments, a system can perform the acts of FIG. 15.

As illustrated in FIG. 15, the series of acts 1500 can include an act 1510 of establishing a first connection between the mobile device and a support terminal. In particular, the act 1510 can include sending a request for a video chat through a series of servers, establishing the first connection between the mobile device and the support terminal, establishing a peer-to-peer connection between the mobile device and the support terminal, and maintaining the first connection through the peer-to-peer connection. Alternatively, if a peer-to-peer connection is not available, the series of servers may maintain the first connection.

As shown in FIG. 15, the series of acts 1500 also includes an act 1520 of conducting a video chat transmitted through the first connection. In particular, the act 1520 conducts the video chat transmitted through the peer-to-peer connection. Alternatively, if the series of servers are maintaining the video chat, the act 1520 conducts the video chat transmitted through the series of servers.

As shown in FIG. 15, the series of acts 1500 also includes an act 1530 of receiving a display element through a second connection. The act 1530 can include receiving a trigger through the second connection and executing, code stored on the mobile device, in response to receiving the trigger, to activate a capability of the mobile device. As referred to herein, a "capability" of a mobile device refers to a function of a mobile device that is available externally from the mobile application implementing the series of acts 1500 (e.g. operating a camera or composing a text-based message). Additionally, the second connection of the act 1530 can be a connection through a WebSocket server.

As shown in FIG. 15, the series of acts 1500 also includes an act 1540 of dividing a display screen of the mobile device into at least a first pane and a second pane. The act 1540 can include receiving a trigger, along with receiving the display element in the act 1530 and dividing the display screen in response. Alternatively, the act 1540 may divide the display screen into more than two panes. For example, if multiple display elements are received simultaneously, the act 1540 may divide the display screen into three or more panes.

As further shown in FIG. 15, the series of acts 1500 also includes an act 1550 and an act 1560, wherein the act 1550 provides the video chat in the first pane and the act 1560 provides the display element in the second pane. It will be appreciated, however, that both the video chat and the display element can be provided in any available pane just as effectively.

Figure 16:
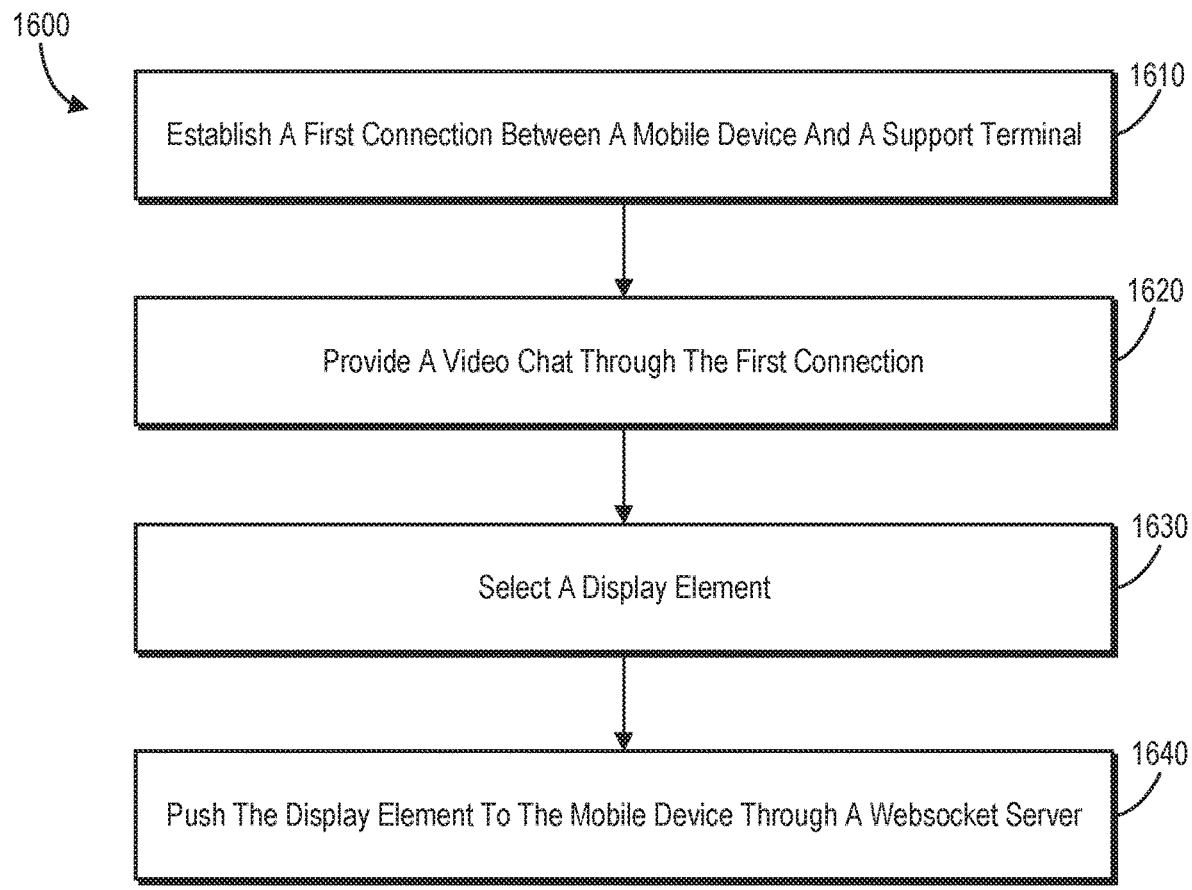
FIG. 16 illustrates a flowchart of a series of acts in another method of implementing a dual pane display in accordance with one or more embodiments.

FIG. 16 illustrates a flowchart of series of acts 1600 of implementing a dual pane display on a support terminal in accordance with one or more embodiments. As illustrated in FIG. 16, the series of acts 1600 can include an act 1610 of establishing a first connection between a mobile device and a support terminal. Mirroring the act 1510 of FIG. 15, the act 1610 can include receiving a request for a video chat through a series of servers, establishing the first connection between the mobile device and the support terminal, establishing a peer-to-peer connection between the mobile device and the support terminal, and maintaining the first connection through the peer-to-peer connection. Alternatively, if a peer-to-peer connection is not available, the series of servers may maintain the first connection.

As shown in FIG. 16, the series of acts 1600 also includes an act 1620 of providing a video chat through the first connection. Similar to the act 1520, the act 1620 conducts the video chat transmitted through the peer-to-peer connection. Alternatively, if the series of servers are maintaining the video chat, the act 1620 conducts the video chat transmitted through the series of servers.

As shown in FIG. 16, the series of acts 1600 also includes an act 1630 of selecting a display element. The act 1600 can include selecting a display element from a set of display elements stored on the support terminal. Alternatively, the display elements can be stored on a separate server or database and the support terminal accesses the server or database to obtain the desired display element.

Further, as shown in FIG. 16, the series of acts 1600 also includes an act 1640 of pushing the display element to the mobile device through a WebSocket server. In particular, the act 1640 can include directly pushing a display element to the mobile device. Alternatively, the act 1640 can include pushing a location of the display element to the mobile device, wherein the location can comprise a link to the database storing the mobile device. Additionally, or alternatively, the act 1640 can include pushing a trigger to the mobile device to initiate code stored on the mobile device to activate a capability of the mobile device.

Thus, as described above, the system is a unique combination of interactive panes on a mobile or tablet device that can be changed dynamically through a web socket layer that is utilized to handle real time communication actions between a second pane and the support representative sending the changes to the second pane. Further, each second pane may change based on the action or function of a representative user interacting with a backend support center. Additionally, a first pane is continuously streaming audio and video to the mobile device during the interactions with the second pane.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1700 illustrates, in block diagram form, an exemplary computing device 1700 that may be configured to perform one or more of the processes described above. One will appreciate that the environment 100 can comprise implementations of the computing device 1700. As shown by FIG. 17, the computing device 1700 can comprise a processor 1702, memory 1704, a storage device 1706, an I/O interface 1708, and a communication interface 1710. While an exemplary computing device 1700 is shown in FIG. 17, the components illustrated in FIG. 17 are not intended to be limiting. Additional or alternative components may be used in other embodiments. Furthermore, in certain embodiments, a computing device 1700 can include fewer components than those shown in FIG. 17. Components of computing device 1700 shown in FIG. 17 will now be described in additional detail.

In particular embodiments, processor(s) 1702 includes hardware for executing instructions, such as those making up a computer program. As an example and not by way of limitation, to execute instructions, processor(s) 1702 may retrieve (or fetch) the instructions from an internal register, an internal cache, memory 1704, or a storage device 1706 and decode and execute them. In particular embodiments, processor(s) 1702 may include one or more internal caches for data, instructions, or addresses. As an example and not by way of limitation, processor(s) 1702 may include one or more instruction caches, one or more data caches, and one or more translation lookaside buffers (TLBs). Instructions in the instruction caches may be copies of instructions in memory 1704 or storage 1706.

The computing device 1700 includes memory 1704, which is coupled to the processor(s) 1702. The memory 1704 may be used for storing data, metadata, and programs for execution by the processor(s). The memory 1704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1704 may be internal or distributed memory.

The computing device 1700 includes a storage device 1706 includes storage for storing data or instructions. As an example, and not by way of limitation, storage device 1706 can comprise a non-transitory storage medium described above. The storage device 1706 may include a hard disk drive (HDD), a floppy disk drive, flash memory, an optical disc, a magneto-optical disc, magnetic tape, or a Universal Serial Bus (USB) drive or a combination of two or more of these. Storage device 1706 may include removable or non-removable (or fixed) media, where appropriate. Storage device 1706 may be internal or external to the computing device 1700. In particular embodiments, storage device 1706 is non-volatile, solid-state memory. In particular embodiments, storage device 1706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1700 also includes one or more input or output ("I/O") devices/interfaces 1708, which are provided to allow a user to provide input to (such as user strokes), receive output from, and otherwise transfer data to and from the computing device 1700. These I/O devices/interfaces 1708 may include a mouse, keypad or a keyboard, a touch screen, camera, optical scanner, network interface, modem, other known I/O devices or a combination of such I/O devices/interfaces 1708. The touch screen may be activated with a stylus or a finger.

The I/O devices/interfaces 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1708 is configured to provide graphical data to a display for presentation to a user. The graphical data may be representative of one or more graphical user interfaces and/or any other graphical content as may serve a particular implementation.

The computing device 1700 can further include a communication interface 1710. The communication interface 1710 can include hardware, software, or both. The communication interface 1710 can provide one or more interfaces for communication (such as, for example, packet-based communication) between the computing device and one or more other computing devices 1700 or one or more networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1710. As an example and not by way of limitation, computing device 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing device 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1700 may include any suitable communication interface 1710 for any of these networks, where appropriate.

The computing device 1700 can further include a bus 1712. The bus 1712 can comprise hardware, software, or both that couples components of computing device 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    conducting a video chat between a client device and a support terminal, the video chat transmitted through a first connection;
    receiving a check deposit trigger pushed through a second connection by the support terminal;
    in response to receiving the check deposit trigger;
        providing, on a display of the client device, the video chat between the client device and the support terminal in a first pane and a check deposit element in a second pane;
        activating a camera of the client device; and
        displaying, within the check deposit element, a viewfinder display providing a stream of image data received from the camera of the client device; and
    during the video chat:
        capturing one or more images of a check utilizing the stream of image data provided by the viewfinder display displayed within the check deposit element; and
        transmitting the one or more images of the check for deposit by the support terminal.

2. The method of claim 1, further comprising:
    receiving a deposit receipt pushed through the second connection by the support terminal during the video chat; and
    providing the deposit receipt in the second pane as an overlay over the check deposit element.

3. The method of claim 2, further comprising modifying a size of the second pane based on a size of the deposit receipt.

4. The method of claim 1, further comprising:
    receiving, from the support terminal, a display trigger during the video chat; and
    in response to receiving the display trigger, dividing the display of the client device into at least the first pane and the second pane,
    wherein providing the video chat between the client device and the support terminal in the first pane and the check deposit element in the second pane is further in response to dividing the display.

5. The method of claim 1, wherein activating the camera of the client device comprises:
    providing, at the client device, a selectable option for selecting among a plurality of cameras of the client device;
    receiving a user interaction at the client device selecting one camera from the plurality of cameras of the client device; and
    activating the camera of the client device based on the user interaction.

6. The method of claim 1, wherein capturing the one or more images of the check utilizing the stream of image data provided by the viewfinder display displayed within the check deposit element comprises capturing at least one of a front-side image of the check or a back-side image of the check using the viewfinder display during the video chat.

7. The method of claim 1, wherein:
    the client device comprises a mobile device; and
    providing, on the display of the client device, the video chat between the client device and the support terminal in the first pane and the check deposit element in the second pane comprises providing the first pane and the second pane within a mobile application of the mobile device.

8. The method of claim 1, further comprising, during the video chat:
    capturing one or more additional images of one or more additional checks utilizing the check deposit element; and
    transmitting the one or more additional images of the one or more additional checks for deposit by the support terminal.

9. A non-transitory computer-readable medium storing instructions that, when executed by at least one processor, cause a computing device to:
    conduct a video chat between a client device and a support terminal, the video chat transmitted through a first connection;
    receive a check deposit trigger pushed through a second connection by the support terminal;
    in response to receiving the check deposit trigger;

provide, on a display of the client device, the video chat between the client device and the support terminal in a first pane and a check deposit element in a second pane;

activate a camera of the client device; and display, within the check deposit element, a viewfinder display providing a stream of image data received from the camera of the client device; and during the video chat:

capture one or more images of a check utilizing the stream of image data provided by the viewfinder display displayed within the check deposit element; and transmit the one or more images of the check for deposit by the support terminal.

10. The non-transitory computer-readable medium of claim 9, further comprising instructions that, when executed by the at least one processor, cause the computing device to:

receive a deposit receipt pushed through the second connection by the support terminal during the video chat; and provide the deposit receipt in the second pane as an overlay over the check deposit element.

11. The non-transitory computer-readable medium of claim 10, further comprising instructions that, when executed by the at least one processor, cause the computing device to modify a size of the second pane based on a size of the deposit receipt.

12. A method comprising:

conducting a video chat between a client device and a support terminal, the video chat transmitted through a first connection;

transmitting, to the client device through a second connection, a check deposit trigger to cause:

division of a display of the client device into at least a first pane displaying the video chat and a second pane displaying a check deposit element;

activation of a camera of the client device; and display, within the check deposit element, a viewfinder display providing a stream of image data received from the camera of the client device; and during the video chat:

identifying check deposit data corresponding to one or more images of a check captured using the stream of image data provided by the viewfinder display displayed within the check deposit element; and depositing the check in a user account using the check deposit data.

13. The method of claim 12, further comprising:

generating a deposit receipt in response to depositing the check; and transmitting the deposit receipt to the client device.

14. The method of claim 13, wherein:

the client device comprises a mobile device; and transmitting the deposit receipt to the client device comprises transmitting the deposit receipt to a mobile application of the mobile device.

15. The method of claim 12, further comprising, during the video chat:

receiving additional check deposit data corresponding to one or more additional images of one or more additional checks captured using the check deposit element; and depositing the one or more additional checks in one or more user accounts identified from the one or more additional checks using the additional check deposit data.

16. The method of claim 12, wherein the check deposit data comprises at least one of:

the one or more images of the check;

an account number;

a routing number;

a courtesy deposit amount;

a legal deposit amount;

a check date corresponding to the check; or processing error data.

17. The method of claim 16, wherein the check deposit data comprises the processing error data and further comprising:

receiving, at the support terminal, user input corresponding to the processing error data; and modifying the check deposit data based on the user input.

18. The method of claim 12, wherein identifying the check deposit data corresponding to the one or more images of the check comprises:

providing the one or more images of the check to a server for data extraction; and receiving the check deposit data corresponding to the one or more images of the check from the server.

19. The non-transitory computer-readable medium of claim 9, wherein the instructions, when executed by the at least one processor, cause the computing device to activate the camera of the client device by:

providing, at the client device, a selectable option for selecting among a plurality of cameras of the client device;

receiving a user interaction at the client device selecting one camera from the plurality of cameras of the client device; and activating the camera of the client device based on the user interaction.

20. The non-transitory computer-readable medium of claim 9, wherein the instructions, when executed by the at least one processor, cause the computing device to capture the one or more images of the check utilizing the stream of image data provided by the viewfinder display displayed within the check deposit element by capturing at least one of a front-side image of the check or a back-side image of the check using the viewfinder display during the video chat.

* * * * *